US007817573B2

(12) United States Patent
Koezuka

(10) Patent No.: US 7,817,573 B2
(45) Date of Patent: Oct. 19, 2010

(54) COMMUNICATION PROCESSOR AND METHOD OF PERFORMING COMMUNICATIONS WITH COMMUNICATION DEVICES

(75) Inventor: Yahiro Koezuka, Kyoto (JP)

(73) Assignee: Omron Corporation, Kyoto (JP)

( * ) Notice: Subject to any disclaimer, the term of this patent is extended or adjusted under 35 U.S.C. 154(b) by 652 days.

(21) Appl. No.: 11/802,729

(22) Filed: May 24, 2007

(65) Prior Publication Data

US 2007/0286227 A1    Dec. 13, 2007

(30) Foreign Application Priority Data

Jun. 9, 2006 (JP) ............ P.2006-160747
Nov. 13, 2006 (JP) ............ P.2006-306147

(51) Int. Cl.
*G06F 11/00* (2006.01)
*H04L 12/413* (2006.01)

(52) U.S. Cl. ................... 370/252; 370/445
(58) Field of Classification Search .......... None
See application file for complete search history.

(56) References Cited

U.S. PATENT DOCUMENTS

| 5,581,548 | A *  | 12/1996 | Ugland et al. ............... 370/330 |
| 7,012,971 | B2 * | 3/2006  | Chen et al. .................. 375/316 |
| 7,243,855 | B2 * | 7/2007  | Matsumoto et al. ......... 235/492 |
| 2005/0288047 | A1 * | 12/2005 | Ananthanarayanan et al. ... 455/518 |
| 2006/0013285 | A1 * | 1/2006 | Kobayashi et al. .......... 375/132 |
| 2006/0050826 | A1 * | 3/2006 | Date et al. .................. 375/362 |
| 2007/0287464 | A1 * | 12/2007 | Hamamoto et al. ......... 455/447 |

FOREIGN PATENT DOCUMENTS

JP    2006-73034    3/2006

OTHER PUBLICATIONS

EPCTM Radio-Frequency Identity Protocals Class-1 Generation-2 UHF RFID Protocal for Communications at 860 MHz-960 MHz Version 1.0.9., Jan. 31, 2005.

* cited by examiner

*Primary Examiner*—Nittaya Juntima
*Assistant Examiner*—Rhonda Murphy
(74) *Attorney, Agent, or Firm*—Dickstein Shapiro LLP

(57) ABSTRACT

Embodiments disclose communication processors, processing devices, and methods of performing communications with communication devices. A communication processor, adapted to perform communications with a plurality of communication devices each of which is provided with identifying information, has an instruction transmitter configured to transmit an instruction designating a first segment number indicative of a total number of communication segments to be used to perform communications with the communication devices, a collision number identifier configured to identify a collision number indicative of how many of the communication segments detect a collision between the communication devices when the communications are performed with the communication devices under a condition that each of the communication devices is allocated to one of the communication segments, a segment number identifier configured to identify a second segment number, and a segment number updater configured to update the first segment number with the second segment number.

10 Claims, 22 Drawing Sheets

FIG. 11

NUMBER OF COMMUNICATION APPARATUSES B=29

| VALUE OF Q | EXPECTED VALUE E | EVALUATED VALUE V |
|---|---|---|
| 0 | 0 | 0 |
| 1 | 1.00E-07 | 5E-08 |
| 2 | 0.00921 | 0.0023 |
| 3 | 0.68964 | 0.08621 |
| 4 | 4.75985 | 0.29749 |
| 5 | 11.9214 | 0.37254 |
| 6 | 18.6592 | 0.29155 |
| 7 | 23.2821 | 0.18189 |
| 8 | 25.9899 | 0.10152 |
| 9 | 27.4552 | 0.05362 |
| 10 | 28.2174 | 0.02756 |
| 11 | 28.6061 | 0.01397 |
| 12 | 28.8024 | 0.00703 |

FIG. 16

| VALUE OF Q | \multicolumn{12}{c}{NUMBER OF COLLISIONS} | |
|---|---|---|---|---|---|---|---|---|---|---|---|---|
|  | 0 | 1 | 2 | 3 | 4 | 5 | 6 | 7 | 8 | 9 | 10 | 11 |
| 0 | 1 | 2≦ | ... | ... | ... | ... | ... | ... | ... | ... | ... | ... |
| ... | ... | ... | ... | ... | ... | ... | ... | ... | ... | ... | ... | ... |
| 9 | 1 | 33 | 47 | 58 | 67 | 75 | 83 | 90 | 96 | 103 | 109 | 114 |
| 10 | 1 | 46 | 65 | 80 | 93 | 105 | 115 | 125 | 134 | 142 | 150 | 158 |
| 11 | 1 | 65 | 92 | 113 | 131 | 147 | 161 | 174 | 187 | 198 | 200≦ | 200≦ |
| 12 | 1 | 91 | 129 | 159 | 184 | 200≦ | 200≦ | 200≦ | 200≦ | 200≦ | 200≦ | 200≦ |
| 13 | 1 | 129 | 182 | 200≦ | 200≦ | 200≦ | 200≦ | 200≦ | 200≦ | 200≦ | 200≦ | 200≦ |
| 14 | 1 | 182 | 200≦ | 200≦ | 200≦ | 200≦ | 200≦ | 200≦ | 200≦ | 200≦ | 200≦ | 200≦ |
| ... | ... | ... | ... | ... | ... | ... | ... | ... | ... | ... | ... | ... |

FIG. 17

| VALUE OF Q | ... | 82 | 83 | 84 | 85 | 86 | 87 | 88 | 89 | 90 | 91 | ... |
|---|---|---|---|---|---|---|---|---|---|---|---|---|
| 0 | ...... | — | — | — | — | — | — | — | — | — | — | ... |
| 1 | ...... | — | — | — | — | — | — | — | — | — | — | ... |
| 2 | ...... | — | — | — | — | — | — | — | — | — | — | ... |
| 3 | ...... | 0.001646 | 0.001458 | 0.001291 | 0.001143 | 0.001012 | 8.96E-04 | 7.93E-04 | 7.02E-04 | 6.21E-04 | 5.49E-04 | ... |
| 4 | ...... | 0.440035 | 0.417563 | 0.396182 | 0.375843 | 0.356498 | 0.338103 | 0.320615 | 0.303992 | 0.288195 | 0.273184 | ... |
| 5 | ...... | 6.265597 | 6.143819 | 6.023533 | 5.904765 | 5.787539 | 5.671872 | 5.557783 | 5.445285 | 5.334391 | 5.225116 | ... |
| 6 | ...... | 22.89915 | 22.81625 | 22.73034 | 22.64155 | 22.54999 | 22.45575 | 22.35896 | 22.25971 | 22.1581 | 22.05424 | ... |
| 7 | ...... | 43.44171 | 43.62796 | 43.80864 | 43.98384 | 44.15363 | 44.31809 | 44.47727 | 44.63127 | 44.78014 | 44.92396 | ... |
| 8 | ...... | 59.72152 | 60.21369 | 60.70111 | 61.18381 | 61.66181 | 62.13513 | 62.60382 | 63.06791 | 63.5274 | 63.98234 | ... |
| 9 | ...... | 69.9906 | 70.70577 | 71.41788 | 72.12695 | 72.83297 | 73.53596 | 74.23592 | 74.93287 | 75.62681 | 76.31775 | ... |
| 10 | ...... | 75.76063 | 76.60964 | 77.45694 | 78.3025 | 79.14634 | 79.98846 | 80.82885 | 81.66753 | 82.50449 | 83.33974 | ... |
| 11 | ...... | 78.81936 | 79.74161 | 80.66295 | 81.58336 | 82.50287 | 83.42144 | 84.33912 | 85.25587 | 86.1717 | 87.08662 | ... |
| ... | ... | ... | ... | ... | ... | ... | ... | ... | ... | ... | ... | ... |

NUMBER OF COMMUNICATION APPARATUSES

FIG. 18

| VALUE OF Q | NUMBER OF COMMUNICATION APPARATUSES ||||||||||| |
|---|---|---|---|---|---|---|---|---|---|---|---|
| | ... | 82 | 83 | 84 | 85 | 86 | 87 | 88 | 89 | 90 | 91 | ... |
| 0 | ... | — | — | — | — | — | — | — | — | — | — | ... |
| 1 | ... | — | — | — | — | — | — | — | — | — | — | ... |
| 2 | ... | — | — | — | — | — | — | — | — | — | — | ... |
| 3 | ... | 0.00021 | 0.00018 | 0.00016 | 0.00014 | 0.00013 | 0.00011 | 9.9E-05 | 8.8E-05 | 7.8E-05 | 6.9E-05 | ... |
| 4 | ... | 0.0275 | 0.0261 | 0.02476 | 0.02349 | 0.02228 | 0.02113 | 0.02004 | 0.019 | 0.01801 | 0.01707 | ... |
| 5 | ... | 0.1958 | 0.19199 | 0.18824 | 0.18452 | 0.18086 | 0.17725 | 0.17368 | 0.17017 | 0.1667 | 0.16328 | ... |
| 6 | ... | 0.3578 | 0.3565 | 0.35516 | 0.35377 | 0.35234 | 0.35087 | 0.34936 | 0.34781 | 0.34622 | 0.3446 | ... |
| 7 | ... | 0.33939 | 0.34084 | 0.34226 | 0.34362 | 0.34495 | 0.34624 | 0.34748 | 0.34868 | 0.34984 | 0.35097 | ... |
| 8 | ... | 0.23329 | 0.23521 | 0.23711 | 0.239 | 0.24087 | 0.24272 | 0.24455 | 0.24636 | 0.24815 | 0.24993 | ... |
| 9 | ... | 0.1367 | 0.1381 | 0.13949 | 0.14087 | 0.14225 | 0.14362 | 0.14499 | 0.14635 | 0.14771 | 0.14906 | ... |
| 10 | ... | 0.07398 | 0.07481 | 0.07564 | 0.07647 | 0.07729 | 0.07811 | 0.07893 | 0.07975 | 0.08057 | 0.08139 | ... |
| 11 | ... | 0.03849 | 0.03894 | 0.03939 | 0.03984 | 0.04028 | 0.04073 | 0.04118 | 0.04163 | 0.04208 | 0.04252 | ... |
| ... | ... | ... | ... | ... | ... | ... | ... | ... | ... | ... | ... | ... |

FIG. 19

| NUMBER OF COMMUNICATON APPARATUSES | OPTIMUM VALUE OF Q |
|---|---|
| 1 | 0 |
| ⋮ | ⋮ |
| 82 | 6 |
| 83 | 6 |
| 84 | 6 |
| 85 | 6 |
| 86 | 6 |
| 87 | 6 |
| 88 | 6 |
| 89 | 7 |
| 90 | 7 |
| 91 | 7 |
| ⋮ | ⋮ |

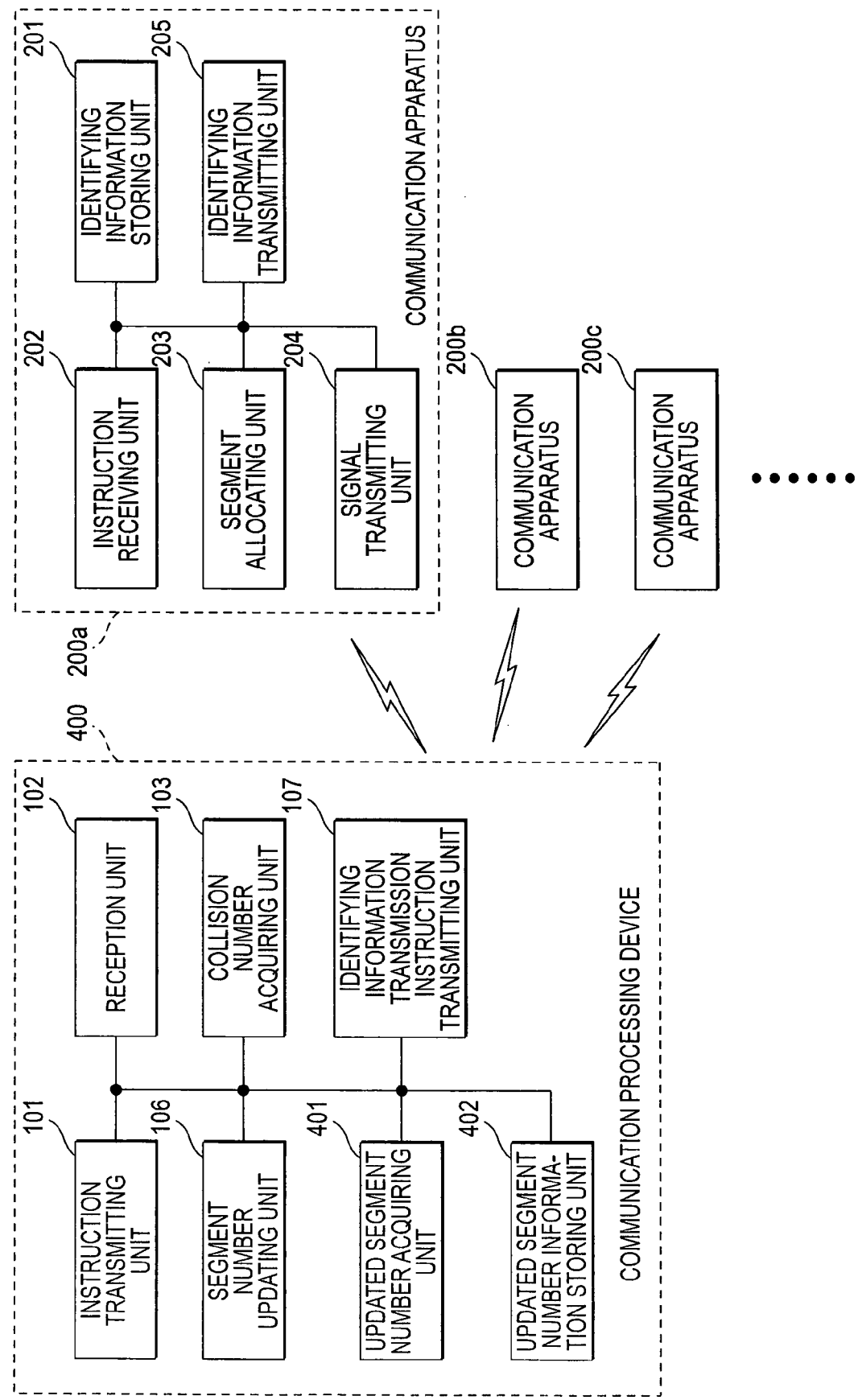

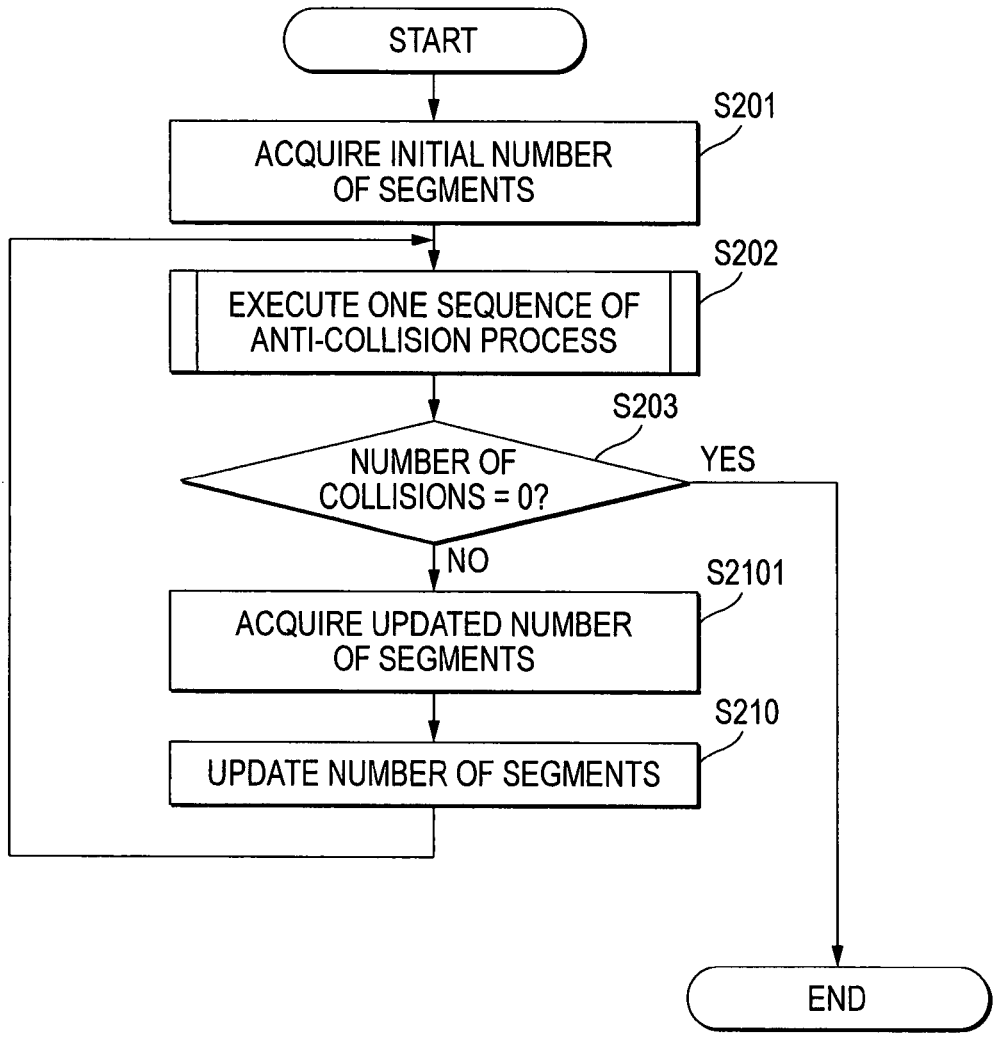

COMMUNICATION PROCESSOR AND METHOD OF PERFORMING COMMUNICATIONS WITH COMMUNICATION DEVICES

This application is based on and claims the benefit of priority from the prior Japanese Patent Application No. 2006-160747, filed on Jun. 9, 2006 and No. 2006-306147, filed on Nov. 13, 2006, the entire contents of which are hereby incorporated by reference.

BACKGROUND OF THE INVENTION

1. Technical Field

The present invention relates to a communication processing device performing communication with a communication apparatus such as an Radio Frequency Identity (RFID).

2. Background Art

In related art, as the number of communication apparatuses increases at the time of performing communication with the communication apparatuses having identifying information such as an RFID tag, signals transmitted from the communication apparatuses collide with each other, whereby a communication processing device, for example, an RFID reader/writer which receives the signals from the communication apparatuses cannot normally receive the signals. A circumstance in which the signals collide with each other is called a collision. A process that prevents signals output by a plurality of communication apparatuses from colliding with each other so that the signals of a plurality of communication apparatuses can be read is called an anti-collision process.

The anti-collision process includes an anti-collision process employing a time slot, for example. More specifically, in the plurality of apparatuses having the identifying information arbitrarily allocated to any one of plurality of segments, which are called a time slot, time-dividing timing at which the signals are read and a random number is output to an apparatus included in one time slot for each time slot so as to perform division communication with the RFID tag. When the communication processing device can normally read the random number, it reads the identifying information from the communication apparatus outputting the random. When the plurality of communication apparatuses are allocated to the time slot and the random number output from the communication apparatus of the time slot cannot be read due to occurrence of the collision, the identifying information is not read from the time slot. Similarly, the random numbers are just output from the communication apparatuses of all the time slots. A period during the communication apparatuses are allocated to the time slots and the random numbers are output to all the time slots, and identifying information is read from a communication apparatus in which the collision does not occur is called a sequence. When one sequence is ended, a communication apparatus in which the information is not read is newly allocated to an arbitrary time slot and the above-mentioned process is carried out. The process is ended at the time when the sequence in which the collision does not occur is ended. By this configuration, it becomes possible to read the identifying information of the plurality of communication apparatuses.

In the anti-collision process (a slotted aloha method) employing the time slot described above, it becomes important to set the number of time slots so as to improve processing performance. For example, as the number of time slots increases, occurrence probability of the collision decreases. However as a result, since a process of whether or not to read the identifying information is performed for each time slot, a processing time within one sequence becomes increased. On the contrary, as the number of time slots decreases, the processing time within one sequence decreases. However, occurrence probability of the collision becomes increased.

Consequently, there has been proposed a technology of optimizing the number of time slots by slightly changing the number of time slots depending on the number of responses from the communication apparatus such as the RFID tag has bee proposed in the preceding sequence (for example, see Non-patent literature 1).

[Non-patent literature 1]

"EPC™ Radio-Frequency Identity protocols Class-1 Generation-2 UHF RFID Protocol for Communications at 860 MHz-960 MHz Version 1.0.9" [online], January, 2005, EPCglobal Inc™, [searched on Apr. 4, 2006], Internet <URL:http://www.epcglobalinc.org/standards_technology/EPC global2UHFRFIDProtocolVl09122005.Pdf> P. 84

However, in a conventional communication processing device, since the number of time slots is slightly changed depending on the number of responses in a preceding sequence without considering the number of communication apparatuses existing within an area in which the communication apparatuses can communicate with the communication processing device at the time of changing the number of time slots, it takes a long time to optimize the number of time slots depending on the number of communication apparatuses. Accordingly, there is a problem that it is difficult to sufficiently shorten a time required for an anti-collision process.

When the number of communication apparatuses which can communicate with the communication processing device is substantially turned out, the initial number of time slots may be set to a proper value depending on the number of communication apparatuses. However, it was difficult to acquire the number of communication apparatuses that can communicate with the communication processing device in the past.

Although the number of communication apparatuses was substantially turned out, it was difficult to determine what number of time slots is proper depending on the number of communication apparatuses. Accordingly, it was difficult to set the proper number of time slots.

SUMMARY OF THE INVENTION

In order to achieve the object, according to a first aspect of the present invention, a communication processing device includes: an instruction transmitting unit transmitting an segment number designating instruction serving as an instruction designating a number of segments so as to perform division communication with a plurality of communication apparatuses having identifying information; a collision number acquiring unit acquiring a number of collisions serving as the number of segments in which the collision occurs when the plurality of communication apparatuses allocated to each of the segments having the number of segments designated by the segment number designating instruction perform a communication for each allocated segment; a communication apparatus number estimating unit estimating the number of the plurality communication apparatuses based on the number of segments designated by the segment number designating instruction and the number of collisions; a segment number acquiring unit acquiring the number of segments corresponding to the estimated number of the communication apparatuses based on the number of the communication apparatuses estimated by the communication apparatus number estimating unit; and a segment number updating unit updating the number of segments designated by the segment number designating instruction based on the number of segments acquired by the segment number acquiring unit.

In this configuration, it is possible to estimate the number of communicatable communication apparatuses and to efficiently set the optimum number of segments at the time of performing an anti-collision process for the estimated number of communication apparatuses. Accordingly, it is possible to obtain an increase in speed or in efficiency of the anti-collision process.

An information processing device according to a second aspect of the invention includes: a segment number receiving unit receiving a number of segments for performing division communication with a plurality of communication apparatuses having an identifying information; a collision number receiving unit receiving a number of collisions serving as the number of segments in which the collision occurs at the time of performing communication with the plurality of communication apparatuses allocated to each of the segments having the number of segments for each allocated segment; a communication apparatus number estimating unit estimating the number of the plurality of communication apparatuses based on the number of segments received by the segment number receiving unit and the number of collisions received by the collision number receiving unit; and a communication apparatus number outputting unit outputting the number of the communication apparatuses estimated by the communication apparatus number estimating unit.

In this configuration, it is possible to estimate the number of communicatable communication apparatuses. Accordingly, it is possible to obtain the increase in speed or in efficiency of the anti-collision process by setting the number of segments by means of the number of communication apparatuses.

An information processing device according to a third aspect of the invention includes: a communication apparatus number receiving unit receiving a number of a plurality of communication apparatuses having an identifying information; a segment number acquiring unit acquiring a number of segments corresponding to the number of the communication apparatuses based on the number of the communication apparatuses received by the communication apparatus number receiving unit; and a segment number outputting unit outputting the number of segments acquired by the segment number acquiring unit.

In this configuration, it is possible to acquire the optimum number of segments for the number of communication apparatuses.

A communication processing method according to a fourth aspect of the invention includes the steps of: transmitting unit transmitting an segment number designating instruction serving as an instruction designating a number of segments so as to perform division communication with a plurality of communication apparatuses having an identifying information; acquiring a number of collisions serving as the number of segments in which the collision occurs when the plurality of communication apparatuses allocated to each of the segments having the number of segments designated by the segment number designating instruction perform a communication for each allocated segment; estimating the number of the plurality communication apparatuses based on the number of segments designated by the segment number designating instruction and the number of collisions; acquiring the number of segments corresponding to the estimated the number of the communication apparatuses based on the number of the communication apparatuses estimated by the communication apparatus number estimating unit; and updating the number of segments designated by the segment number designating instruction based on the number of segments acquired by the segment number acquiring unit.

An information processing method according to a fifth aspect of the invention includes the steps of: receiving a number of segments for performing division communication with a plurality of communication apparatuses having an identifying information; receiving a number of collisions serving as the number of segments in which the collision occurs at the time of performing communication with the plurality of communication apparatuses allocated to each of the segments having the number of segments for each allocated segment; estimating the number of the plurality of communication apparatuses based on the number of segments received in the step of receiving the number of segments and the number of collisions received in the step of receiving the number of collisions; and outputting the number of the communication apparatuses estimated in the step of estimating the number of the plurality of communication apparatuses.

An information processing method according to a sixth aspect of the invention includes the steps of: receiving a number of a plurality of communication apparatuses having an identifying information; acquiring a number of segments corresponding to the number of the communication apparatuses based on the number of the communication apparatuses received in the step of receiving the number of the communication apparatuses; and outputting the number of segments acquired in the step of acquiring the number of segments.

A computer program product embodied on a computer readable medium, which when executed by a computer, causes the computer to perform operations according to a seventh aspect of the invention includes: transmitting unit transmitting an segment number designating instruction serving as an instruction designating a number of segments so as to perform division communication with a plurality of communication apparatuses having an identifying information; acquiring a number of collisions serving as the number of segments in which the collision occurs when the plurality of communication apparatuses allocated to each of the segments having the number of segments designated by the segment number designating instruction perform a communication for each allocated segment; estimating the number of the plurality communication apparatuses based on the number of segments designated by the segment number designating instruction and the number of collisions; acquiring the number of segments corresponding to the estimated the number of the communication apparatuses based on the number of the communication apparatuses estimated by the communication apparatus number estimating unit; and updating the number of segments designated by the segment number designating instruction based on the number of segments acquired by the segment number acquiring unit.

A computer program product embodied on a computer readable medium, which when executed by a computer, causes the computer to perform operations according to an eighth aspect of the invention includes: receiving a number of segments for performing division communication with a plurality of communication apparatuses having an identifying information; receiving a number of collisions serving as the number of segments in which the collision occurs at the time of performing communication with the plurality of communication apparatuses allocated to each of the segments having the number of segments for each allocated segment; estimating the number of the plurality of communication apparatuses based on the number of segments received in the step of receiving the number of segments and the number of collisions received in the step of receiving the number of collisions; and outputting the number of the communication apparatuses estimated in the step of estimating the number of the plurality of communication apparatuses.

A computer program product embodied on a computer readable medium, which when executed by a computer, causes the computer to perform operations according to a ninth aspect of the invention includes: receiving a number of plurality of communication apparatuses having identifying information; acquiring a number of segments for performing communication with the plurality of communication apparatuses corresponding to the number of communication apparatuses based on the number of communication apparatuses received in the step of receiving the number of communication apparatuses; and outputting the number of segments acquired in the step of acquiring the number of segments.

A computer-readable storage medium in which a computer records a data structure used for a process of estimating the number of plurality of communication apparatuses having an identifying information according to a tenth aspect of the invention includes: data of the number of plurality of communication apparatuses specified by data of the number of segments for performing division communication with the plurality of communication apparatuses; data of the number of collisions serving as the number of segments in which collision occurs when the plurality of communication apparatuses performs communication for each allocated segment; and data of the number of plurality of communication apparatuses specified by the data of the number of segments and the data of collisions, wherein the computer acquires data of the number of communication apparatuses specified by the number of segments designated by a segment number designation instruction serving as an instruction designating the number of segments for performing division communication with the plurality of communication apparatuses and the number of collisions serving as the number of segments in which collision occurs when the plurality of communication apparatuses allocated to the segments corresponding to the number of segments designated by the segment number designation instruction perform communication out of the data of the number of plurality of communication apparatuses.

A computer-readable storage medium in which a computer records a data structure used for a process of acquiring the number of segments for performing division communication with plurality of communication apparatuses having identifying information according to an eleventh aspect of the invention includes: data of the number of plurality of communication apparatuses; and data of the number of segments specified by the data of the number of plurality of communication apparatuses, wherein the computer acquires data of the number of segments specified by the number of plurality of communication apparatuses for performing division communication out of the data of the numbers of plurality of segments.

A computer-readable storage medium in which a computer records a data structure used for a process of acquiring the number of segments for performing division communication with a plurality of communication apparatuses having an identifying information according to a twelfth aspect of the invention includes: data of the number of the plurality of communication apparatuses specified by data of the number of segments for performing a division communication with the plurality of communication apparatuses; data of the number of collisions serving as the number of segments in which collision occurs when the plurality of communication apparatuses performs communication for each allocated segment; and data of the updated number of segments serving as data used for updating the number of segments, which is specified by the data of the number of segments and the data of collisions, wherein the computer acquires data of the number of updated segments specified by the number of segments designated by a segment number designation instruction serving as an instruction designating the number of segments for performing division communication with the plurality of communication apparatuses and the number of collisions serving as the number of segments in which collision occurs when the plurality of communication apparatuses allocated to the segments corresponding to the number of segments designated by the segment number designation instruction perform communication out of the data of the number of plurality of communication apparatuses.

A data structure according to a thirteenth aspect of the invention is used for a process in which a computer acquires the number of segments for performing division communication with a plurality of communication apparatuses having identifying information. The data structure includes: data of the number of plurality of communication apparatuses; and data of the number of segments specified by the data of the number of plurality of communication apparatuses, wherein the computer acquires data of the number of segments specified by the number of plurality of communication apparatuses performing division communication out of the data of the numbers of plurality of segments.

A communication processing device according to a fourteenth aspect of the invention includes: an instruction transmitting unit transmitting a segment number designation instruction serving as an instruction designating the number of segments for performing division communication with a plurality of communication apparatuses having identifying information; a collision number acquiring unit acquiring the number of collisions serving as the number of segments in which collision occurs when the plurality of communication apparatuses allocated to the segments corresponding to the number of segments designated by the segment number designation instruction performs communication for each allocated segment; a segment number acquiring unit acquiring the number of segments corresponding to the number of remaining communication apparatuses based on the number of segments designated by the segment number designation instruction and the number of remaining communication apparatuses acquired based on the number of collisions; and a segment number updating unit updating the number of segments designated by the segment number designation instruction based on the number of segments acquired by the segment number acquiring unit.

An information processing device according to a fifteenth aspect of the invention includes: a segment number receiving unit receiving the number of segments for performing division communication with a plurality of communication apparatuses having identifying information; a collision number receiving unit receiving the number of collisions serving as the number of segments in which collision occur at the time of performing communication with the plurality of communication apparatuses allocated to each of the segments corresponding to the number of segments for each allocated segment; a communication apparatus number estimating unit acquiring the number of remaining communication apparatuses based on the number of segments received by the segment number receiving unit and the number of collisions received by the collision number receiving unit; and a communication apparatus number outputting unit outputting the number of communication apparatuses acquired by the communication apparatus number estimating unit.

A communication processing method according to a sixteenth aspect of the invention includes the steps of: transmitting a segment number designation instruction serving as an instruction designating the number of segments for performing division communication with a plurality of communication apparatuses having identifying information; acquiring the number of collisions serving as the number of segments in which collision occurs when the plurality of communication apparatuses allocated to the segments corresponding to the number of segments designated by the segment number designation instruction perform communication for each allocated segment; acquiring the number of segments corresponding to the number of remaining communication apparatuses based on the number of remaining communication apparatuses acquired by the segment number designation instruction and the number of collisions; and updating the number of segments designated by the segment number designation instruction based on the number of segments acquired by the acquiring of the number of segments.

An information processing method according to a seventeenth aspect of the invention includes the steps of: receiving the number of segments for performing division communication with a plurality of communication apparatuses having identifying information; receiving the number of collisions serving as the number of segments in which collision occurs at the time of performing a communication with the plurality of communication apparatuses allocated to the segments corresponding to the number of segments for each updated segment; estimating the number of remaining communication apparatuses based on the number of segments received in the step of receiving the number of segments and the number of collisions received in the step of receiving the number of collisions; and outputting the number of communication apparatuses estimated in the step of estimating the number of communication apparatuses.

A computer program product embodied on a computer readable medium, which when executed by a computer, causes the computer to perform operations according to an eighteenth aspect of the invention includes: transmitting a segment number designation instruction serving as an instruction designating the number of segments for performing division communication with a plurality of communication apparatuses having identifying information; acquiring the number of collisions serving as the number of segments in which collision occurs when the plurality of communication apparatuses allocated to the segments corresponding to the number of segments designated by the segment number designation instruction perform communication for each allocated segment; acquiring the number of segments corresponding to the number of remaining communication apparatuses based on the number of segments designated by the segment number designation instruction and the number of remaining communication apparatuses acquired based on the number of collisions; and updating the number of segments designated by the segment number designation instruction based on the number of segments acquired by the acquiring of the number of segments.

A computer program product embodied on a computer readable medium, which when executed by a computer, causes the computer to perform operations according to a nineteenth aspect of the invention includes: receiving the number of segments for performing division communication with a plurality of communication apparatuses having identifying information; receiving the number of collisions serving as the number of segments in which collision occurs at the time of performing communication with the plurality of communication apparatuses allocated to the segments corresponding to the number of segments for each updated segment; estimating the number of remaining communication apparatuses based on the number of segments received by the receiving of the number of segments and the number of collisions received in the step of receiving the number of collisions; and outputting the number of communication apparatuses estimated in the step of estimating the number of communication apparatuses.

BRIEF DESCRIPTION OF DRAWINGS

FIG. 11 is a diagram illustrating a correspondence relationship of the value of Q, an expected value E, and an evaluated value V according to the embodiment of the invention;

FIG. 16 is a diagram illustrating a corresponding apparatus number information management table according to the embodiment of the invention;

FIG. 17 is a diagram illustrating a correspondence relationship of the number of communication apparatuses, the value of Q, and an expected value E according to the embodiment of the invention;

FIG. 18 is a diagram illustrating a correspondence relationship of the value of Q, the number of communication apparatuses, and an evaluated value according to the embodiment of the invention;

FIG. 19 is a diagram illustrating a segment number information management table according to the embodiment of the invention;

FIG. 20 is a block diagram of a communication system according to a third embodiment of the invention;

FIG. 21 is a flowchart illustrating an operation of the communication system according to the embodiment of the invention;

FIG. 22 is a diagram illustrating an updated segment number information management table according to the embodiment of the invention;

DESCRIPTION OF PREFERRED EMBODIMENTS

Figure 1:
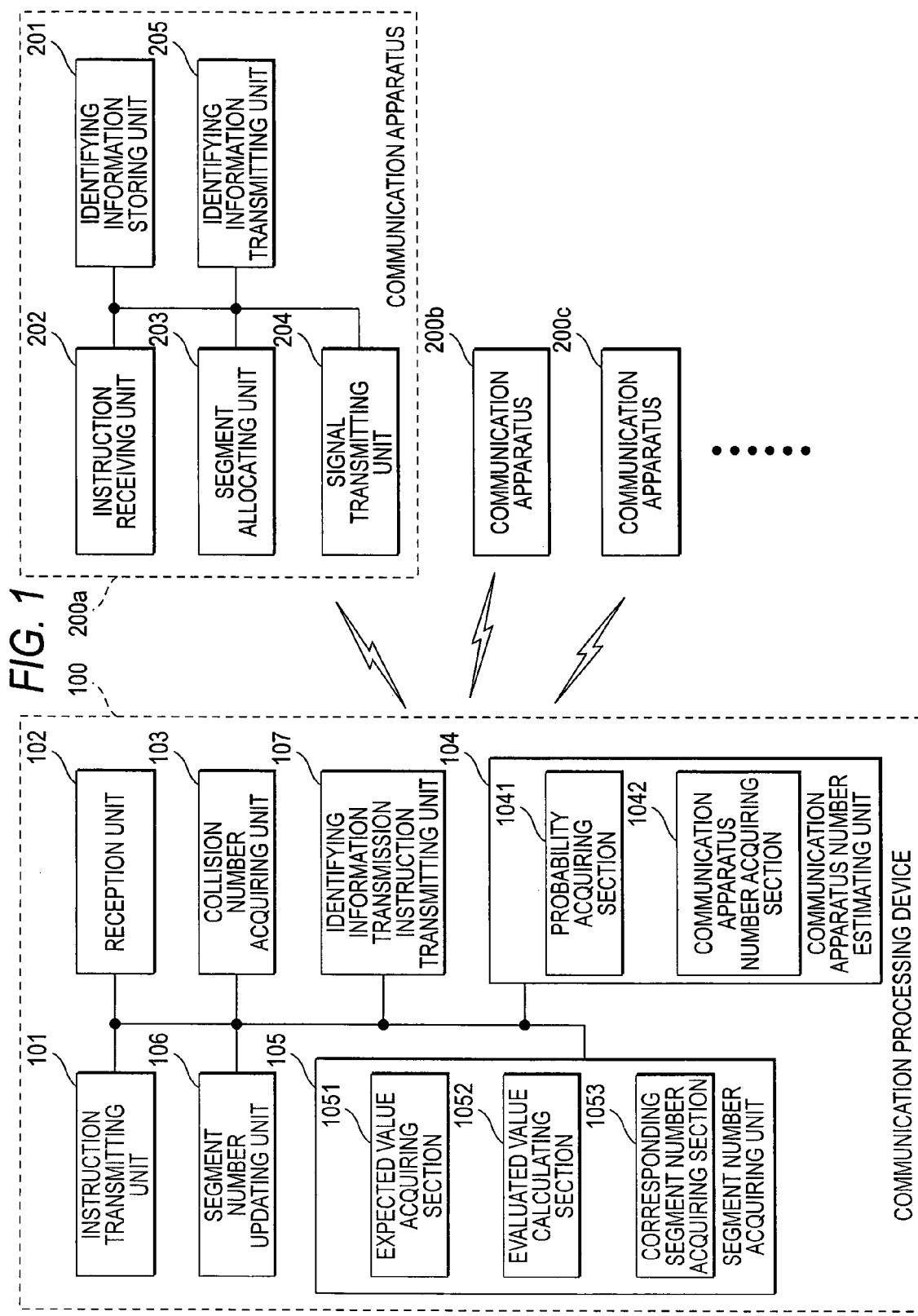
FIG. 1 is a block diagram of a communication system according to a first embodiment of the invention.

Hereinafter, embodiments of a communication processing device will be described with reference to the accompanying drawings. Moreover, in the embodiments of the invention, constituent elements denoted by the same reference numerals and signs perform the same operation, whereby a redundant description thereof may be omitted.

First Embodiment

FIG. 1 is a block diagram of a communication system according to an embodiment of the invention.

The communication system according to the embodiment of the invention includes a communication processing device 100 and a plurality of communication apparatuses 200. Here, for the sake of convenience, the plurality of communication apparatuses 200 are represented by communication apparatuses 200a, 200b, and 200c.

The communication processing device 100 performs communication with the communication apparatuses 200 to read and write signals on the communication apparatuses 200 such as an RFID tag reader/writer. However, the communication processing device 100 may transmit and receive a signal used for transmission and reception with other communication devices which perform communication with the communication apparatuses 200. The communication processing device 100 can communicate with each of the communication apparatuses 200 via wireless connection or wired connection.

The communication processing device 100 includes an instruction receiving unit 101, a reception unit 102, a collision number acquiring unit 103, a communication apparatus number estimating unit 104, a segment number acquiring unit 105, a segment number updating unit 106, and an identifying information transmission instruction transmitting unit 107.

The communication apparatus number estimating unit 104 includes a probability acquiring section 1041 and an estimated communication apparatus number acquiring section 1042.

The segment number acquiring unit 105 includes an expected value acquiring section 1051, an evaluated value calculating unit 1052, and a corresponding segment number acquiring section 1053.

The communication apparatuses 200 can operate in accordance with an instruction output from the communication processing device 100. The communication apparatuses 200 particularly have identifying information as data, thereby outputting the identifying information to the communication processing device 100 in accordance with the instruction from the communication processing device 100. The communication apparatuses 200 include an RFID tag, for example.

The communication apparatuses 200 each include an identifying information storing unit 201, an instruction receiving unit 202, a segment allocating unit 203, a signal transmitting unit 204, and an identifying information transmitting unit 205.

The instruction transmitting unit 101 transmits a segment number designation instruction serving as an instruction designating the number of segments for performing division communication with the plurality of communication apparatuses 200 having the identifying information. Specifically, the identifying information may be any information as long as it is information which can identify one of the plurality of communication apparatuses 200 from the other communication apparatuses 200. For example, the identifying information is constituted by names of the communication apparatuses 200 or manufacturing numbers thereof and unique character strings thereof. In particular, the communication apparatuses 200 are the RFID tags, the identifying information may be an Electronic Product Code (EPC). The segment is a division of a communication time, a frequency for communication or a code used for performing division communication. The segment is specifically called a slot or a channel. In particular, the segment is called a time slot at the time of time-dividing the communication time. The segment is called a channel at the time of dividing the frequency. The number of segments is a value designating the number of the segments dividing the communication time or the frequency and it is called the number of time slots or the number of channels. In particular, a case in which the segment is time slot is described in the embodiment. Hereinafter, the time slot may be called the time slot for sake of convenience. In the present application, information corresponding to the number of segments one for one and specifies the number of segments may be properly used instead of using the number of segments such as the number of time slots. As the result, even in this case, the number of segments is regarded to be used. For example, at the time of communication with the RFID tag, the number of time slots is represented by $2^Q$ (Q is a positive integer in accordance with a standard (for example, an EPC Class 1 Generation 2 standard) and Q is called a value of Q. In a standard of the EPC Class 1 Generation 2, $0 \leq Q \leq 15$ is defined. The value of Q may be used instead of the number of time slots serving as the number of segments. As the result, even in the case, the number of time slots is regarded to be used. The segment number designation instruction may be an instruction directly designating the number of segment. The segment number designation instruction may be a value corresponding to the number of segments one for one and a value designating a value specifying the number of segments such as a value designating the value of Q. The segment number designation instruction may include an instruction setting the number of segments to the communication apparatuses 200. The segment number designation instruction is stored in a storage medium such as a memory (not shown in the drawings) inside or outside the instruction transmitting unit 101. The segment number designation instruction can be updated by the segment number updating unit 106 (described later). When the communication processing device 100 performs the communication with the communication apparatuses 200, the instruction transmitting unit 101 directly transmits the segment number designation instruction to the communication apparatuses 200 in a communicatable scope. While, when the communication processing device 100 does not perform direct communication with the communication apparatuses 200, the instruction transmitting unit 101 transmits the segment number designation instruction to the other communication devices (not shown in the drawings) performing the communication with the communication apparatuses 200 and the other communication devices receiving the segment number designation instruction may transmit the segment number designation instruction to the communication apparatuses 200. The instruction transmitting unit 101 may transmit an instruction other than the segment number designation instruction, for example, an instruction outputting a signal to the communication apparatuses 200 allocated to a predetermined segment or an instruction transmitting the identifying information to a specific communication apparatus 200. The instruction transmitting unit 101 is generally realized by a wireless communication section or a wired communication section, but it may be realized by a broadcasting section.

The reception unit 102 receives the identifying information transmitted by the communication apparatuses 200. The reception unit 102 receives a predetermined signal transmitted by the signal transmitting unit 204 of the communication apparatuses 200. Specifically, the predetermined signal is information which enables identifying the communication apparatuses 200, for example, random numbers which are arbitrarily set by the communication apparatuses 200, the above-mentioned identifying information, or the same information thereas may be used as the predetermined signal. The reception unit 102 is properly realized by the wireless communication section. However, it can be realized even by the broadcasting section receiving a broadcast or the wired communication section.

The collision number acquiring unit 103 acquires the number of collisions serving as the number of segments in which the collision occurs at the time when the communication processing device 100 performs the communication with the plurality of communication apparatuses 200 allocated to each of the segments corresponding to the number of segments designated by the segment number designation instruction described above for each allocated segment. Specifically, the collision acquiring unit 103 acquires the number of collisions serving as the number of segments in which the collision occurs by detecting the collisions occurring when the communication apparatuses 200 perform the communication with the communication processing device 100 for each allocated segment, for example, for each time slot or for each channel. For example, the instruction transmitting unit 101 allocates each of the plurality of communication apparatuses 200 to one of time slots of the number designated by the segment number designation instruction, designates one time slot of plurality of time slots, and outputs the predetermined signal described above to the communication apparatuses 200 allocated thereto. At this time, when the predetermined signal received by the reception unit 102 is not normally read, the collision number acquiring unit 103 detects occurrence of the collision. The collision number acquires the number of collision by counting the number of time slots in which the collision occurs. Occurrence of the collision means that the plurality of communication apparatuses 200 correspond to one segment such as one time slot, that is, they are allocated to one segment. When the communication apparatuses 200 are allocated to the segments, the number of segments in which the communication apparatuses 200 are not allocated may be one or more. The collision number acquiring unit 103 can be generally realized by an MPU or a MEMORY. A processing sequence of the collision number acquiring unit 103 is generally realized by software, which is recorded in a recording medium such as a ROM. However, the processing sequence of the collision number acquiring unit 103 may be realized by hardware (a dedicated circuit).

The identifying information transmission instruction transmitting unit 107 transmits an instruction transmitting the identifying information to the communication apparatuses 200 in which the collision does not occur within one segment. For example, the identifying information transmission instruction transmitting unit 107 transmits an instruction transmitting the identifying information to the communication apparatuses 200 corresponding to a signal in which the collision does not occur out of predetermined signals received by the reception unit 102. Specifically, when the predetermined signal received by the reception unit 102 is information which enables identifying the communication apparatuses 200, for example, the random numbers set by the communication apparatuses 200, the identifying information transmission instruction transmitting unit 107 transmits the transmission instruction of the identifying information set to factors. The identifying information transmission instruction transmitting unit 107 can be realized by the wireless communication section or the wired communication section. When the predetermined signal transmitted to the communication apparatuses 200 is used as the identifying information of the communication apparatuses 200, the identifying information transmission instruction transmitting unit 107 may be omitted.

The communication apparatus number estimating unit 104 estimates the number of the plurality of communication apparatuses 200 based on the number of segments designated by the segment number designation instruction and the number of collisions acquired by the collision number acquiring unit 103. "Estimating the number of plurality of communication apparatuses 200" described herein may include the calculating of the number of communication apparatuses based on a predetermined operational expression or algorithm for calculating the number of communication apparatuses estimated from the number of segments and the number of collisions based on the number of segments and the number of collisions. "Estimating the number of plurality of communication apparatuses 200" described herein may include the reading of information representing a correspondence relationship of the number of segments, the number of collisions, and the number of communication apparatuses estimated from the number of segments and the number of collisions, for example, the number of communication apparatuses estimated from a table. In the present embodiment, a case in which the estimated number of communication apparatuses is acquired, that is, the number of communication apparatuses is estimated by means of the operational expression is described. In a second embodiment, a case in which information representing a correspondence relationship with the estimated number of communication apparatuses, for example, the estimated number of communication apparatuses is acquired, that is, the number of communication apparatuses is estimated by means of the table is described. A process in which the communication apparatus number estimating unit 104 estimates the number of communication apparatuses 200 will be described later. In the present embodiment, a case in which the communication apparatus number estimating unit 104 includes the probability acquiring section 1041 and the estimated communication apparatus number acquiring section 1042 is described. The communication apparatus number estimating unit 104 can be generally realized by the MPU or the memory. A processing procedure of the communication apparatus number estimating unit 104 is generally realized by the software, which is recorded in the recording medium such as the ROM. However, the processing procedure of the communication apparatus number estimating unit 104 may be realized by hardware (a dedicated circuit).

The probability acquiring section 1041 acquires an allocation probability serving as a probability that the plurality of communication apparatuses 200 are allocated to each of the segments corresponding to the number of segments acquired from the instruction transmitting unit 101 so as to satisfy the number of collisions acquired from the collision number acquiring unit 103 as a condition at the time of changing the number of plurality of communication apparatuses 200 for each number of plurality of communication apparatuses 200. Specifically, the probability acquiring section 1041 acquires a combination number when the plurality of communication apparatuses 200 are allocated to each of the segments corresponding to the number of segments designated by the segment number designation instruction so as to satisfy the number of collisions acquired by the collision number acquiring unit 103 as a condition at the time of changing the number of plurality of communication apparatuses 200 within a predetermined range for each number of communication apparatuses 200 and divides the acquired combination number by the number of combinations allocating the plurality of communication apparatuses 200 to each of the segments corresponding to the number of segments designated by the segment number designation instruction to acquire the allocation probability allocating the plurality of communication apparatuses to each of the segments corresponding to the number of segments designated by the segment number designation instruction so as to satisfy the number of collisions as the condition. For example, information representing a correspondence relationship between the number of communication apparatuses 200 and the allocation probability is acquired. The information representing the correspondence relationship with the acquired allocation probability is stored in a memory not shown in the table so that the estimated communication apparatus number acquiring section 1042 to be described later can use the information. Specifically, the probability acquiring section 1041 calculates the number of communication apparatuses by substituting the number of segments designated by the segment number designation instruction and the number of collisions acquired by the collision number acquiring unit 103 into a predetermined operational expression or algorithm for calculating the number of communication apparatuses estimated from the number of segments and the number of collisions by using the number of segments and the number of collisions. The information such as the operation expression or the algorithm is stored in a recording medium not shown, and the information is properly read and executed. A detailed example of a process of the probability acquiring section 1041 will be described later. The probability acquiring section 1041 can be generally realized by the MPU or the memory. A processing procedure of the probability acquiring section 1041 is generally realized by software, which is recorded in the recording medium such as the ROM. However the processing procedure of the probability acquiring section 1041 may be realized by hardware (a dedicated circuit).

The estimated communication apparatus number acquiring section 1042 acquires the number of plurality of communication apparatuses 200 when the probability acquiring section 1041 acquires the highest allocation probability as the number of plurality of communicatable communication apparatuses estimated from the number of segments and the number of collisions. A detailed example of a process of the estimated communication apparatus number acquiring section 1042 will be described later. The estimated communication apparatus number acquiring section 1042 can be generally realized by the MPU or the memory. A processing sequence of the estimated communication apparatus number acquiring section 1042 is generally realized by software, which is recorded in the recording medium such as the ROM. However, the sequence of the estimated communication apparatus number acquiring section 1042 may be realized by hardware (a dedicated circuit).

The segment number acquiring unit 105 uses the number of communication apparatuses estimated by the communication apparatus number estimating unit 104 to acquire the number of segments corresponding to the estimated number of communication apparatuses. In the present embodiment, the segment number acquiring unit 105 acquires the number of segments corresponding to the number of communication apparatuses 200 obtained by subtracting the number of communication apparatuses 200 in which the reception unit 102 receives the identification information from the number of communication apparatuses 200 estimated by the communication apparatus number estimating unit 104. However, a process of subtracting the number of communication apparatuses 200 in which the reception unit 102 receives the identification information from the number of communication apparatuses 200 estimated by the communication apparatus estimating unit 104 may be performed by the communication apparatus number estimating unit 104. "Acquiring the number of segments" described herein may include the calculating of the number of segments corresponding to the number of communication apparatuses by means of a predetermined operational expression or algorithm for calculating the number of segments based on the number of communication apparatuses. "Acquiring the number of segments" may include the reading of information representing a correspondence relationship between the number of communication apparatuses and the number of segments corresponding to the number of communication apparatuses, for example, the number of communication apparatuses from the table. In the present embodiment, a case in which the number of segments is acquired using the operational expression is described. In the second embodiment, a case in which the number of segments is acquired using the information representing the correspondence relationship between the number of communication apparatuses and the number of segments corresponding thereto (e.g., the table) will be described. A process in which the segment number acquiring unit 105 acquires the number of segments will be described later. In the present embodiment, it is described a case in which the segment number acquiring unit 105 includes the expected value acquiring section 1051, the evaluated value calculating section 1052 and the corresponding segment number acquiring section 1053. The segment number acquiring unit 105 can be generally realized by the MPU or the memory. A processing procedure of the segment number acquiring unit 105 is generally realized by software, which is recorded in the recording medium such as the ROM. However, the processing procedure of the segment number acquiring unit 105 may be realized by hardware (a dedicated circuit).

The expected value acquiring section 1051 acquires expected values of the number of communicatable communication apparatuses without occurrence of the collision when the number of segments is changed and the plurality of communication apparatuses 200 corresponding to the number of communication apparatuses estimated by the communication apparatus number estimating unit 104 are allocated to each of the segments of the number of segments for each number of segments. The communication apparatus communicatable without occurrence of the collision means a communication apparatus singularly allocated to one segment. The expected values of the number of communication apparatuses communicatable without occurrence of the collision can be acquired by calculating the aggregate obtained by multiplexing an occurrence probability of all allocation patterns when all estimated communication apparatuses such as the RFID tag are allocated to each of the segments, for example, the time slot by the number of communication apparatuses in the pattern. Consequently, when the same values as the expected values are obtained, a method of calculating the expected values is not considered. The expected value acquiring section 1051 temporarily stores information representing a correspondence relationship between the number of segments and the expected values in the storage medium such as the memory so that the evaluated value calculating section 1052 to be described later can use the information. Specifically, the expected value acquiring section 1051 calculates the number of segments by substituting the number of communication apparatuses estimated by the communication apparatus number estimating unit 104 into a predetermined operational expression or algorithm for calculating the number of segments corresponding to the number of communication apparatuses by using the number of communication apparatuses. The information such as the operation expression or the algorithm is stored in a storage medium not shown, and the information is properly read and executed. A detailed example of a process of the expected value acquiring section 1051 will be described later. The expected value acquiring section 1051 can be generally realized by the MPU or the memory. A processing procedure of the expected value acquiring section 1051 is generally realized by software, which is recorded in the recording medium such as the ROM. However the processing procedure of the expected value acquiring section 1051 may be realized by hardware (a dedicated circuit).

The evaluated value calculating section 1052 calculates evaluated values by substituting the expected values calculated by the expected value acquiring section 1051 and the number of segments corresponding to the expected values into a desired valuation function. Specifically, the number of segments corresponding to the expected values is used when the expected value acquiring section 1051 calculates each of the expected values. The evaluated values described herein are used for evaluating the number of segments estimated optimally for performing a process for avoiding the collision, that is, an anti-collision process from the expected values. The valuation function is set to acquire a higher evaluated value when the expected values increase and the number of segments decreases. In other words, the valuation function is set by considering that when the expected values increase, the number of sequences of the anti-collision process decreases and when the number of segments increase, a processing time in one sequence increases. The valuation function serves as an increasing function for the expected values and a decreasing function for the number of segments. For example, the function $V=E/h$ (V indicates the evaluated value, E indicates the expected value, and h indicates the number of time slots) is used as the valuation function when the time slot is set as the segment. The evaluated value calculating section 1052 temporarily stores information representing a correspondence relationship between the number of segments and the evaluated value in the storage medium such as the memory so that the corresponding segment number acquiring section 1053 to be described later can use the information. Since information defining the valuation function is stored in a storage medium not shown, the information is properly read and used. The evaluated value calculating section 1052 can be generally realized by the MPU or the memory. A processing procedure of the evaluated value calculating section 1052 is generally realized by software, which is recorded in the recording medium such as the ROM. However, the processing procedure of the evaluated value calculating section 1052 may be realized by hardware (a dedicated circuit).

The corresponding segment number acquiring section 1053 acquires the number of segments corresponding to an evaluated value having the highest valuation out of evaluated values calculated by the evaluated value calculating section 1052. The corresponding segment number acquiring section 1053 can be generally realized by the MPU or the memory. A processing procedure of the corresponding segment number acquiring section 1053 is generally realized by software, which is recorded in the recording medium such as the ROM. However, the processing procedure of the corresponding segment number acquiring section 1053 may be realized by hardware (a dedicated circuit).

The segment number updating unit 106 updates the number of segments designated by the segment number designation instruction with the number of segments acquired by the segment number acquiring unit 105. For example, the segment number updating unit 106 updates the segment number designation instruction stored in a memory inside or outside the instruction transmitting unit 101 or information on the number of segments used at the time of forming the segment number designation instruction. Specifically, the above-mentioned instruction transmitting unit 101 outputs the segment number designation instruction for allocating the updated number of segments to the communication apparatuses 200. The segment number updating unit 106 can be generally realized by the MPU or the memory. A processing procedure of the segment number updating unit 106 is generally realized by software, which is recorded in the recording medium such as the ROM. However, the processing procedure of the segment number updating unit 106 may be realized by hardware (a dedicated circuit).

The identifying information storing unit 201 can store the above-mentioned identifying information. The nonvolatile recording medium is suitable for the identifying information storing unit 201, but the identifying information storing unit 201 can be realized by the volatile recording medium. Both the nonvolatile recording medium and the volatile recording medium may be used as the identifying information storing unit 201.

The instruction receiving unit 202 receives the instruction transmitted from the communication processing device 100. In particular, the instruction receiving unit 202 receives the segment number designation instruction serving as an instruction designating the number of segments for performing the division communication with the communication apparatuses 200, which is transmitted by the communication processing device 100. The instruction receiving unit 202 can receive instructions other than the segment number designation instruction. For example, the instruction receiving unit 202 may receive an identifying information transmission instruction transmitted from the communication processing device 100, an instruction changing a value of a segment allocated by the segment allocating unit 203 to be described later, or an instruction outputting a predetermined value such as a random number to the communication apparatuses 200 allocated to a predetermined segment. Here, it is described a case in which the instruction receiving unit 202 directly receives the segment number designation instruction transmitted by the communication processing device 100. However, the instruction receiving unit 202 may receive the segment number designation instruction transmitted via other communication devices from the communication processing device 100. A wireless communication section is suitable for the instruction receiving unit 202. However, the instruction receiving unit 202 can be realized by the broadcasting section receiving the broadcast or the wired communication section.

The segment allocating unit 203 allocates any one of the segments designated in accordance with the segment number designation instruction to the segment allocating unit 203. For example, when the time slot is used as the segment and the segment number designation instruction instructs designating the number of time slots corresponding to 8, the segment allocating unit 203 allocates several slots out of eight times slots corresponding to time slots "0" to "7" as the time slot of the segment allocating unit 203. Allocated values are preserved in a counter, for example. The counter is called a slot counter. The allocated values may be temporarily stored in the storage medium such as the memory not shown, which is provided inside or outside the segment allocating unit 203. The segment allocating unit 203 can be generally realized by the MPU or the memory. A processing sequence of the segment number allocating unit 203 is generally realized by software, which is recorded in the recording medium such as the ROM. However, the sequence of the segment number allocating unit 203 may be realized by hardware (a dedicated circuit).

The signal transmitting unit 204 outputs the above-mentioned predetermined signal for each allocated segment. Specifically, when the above-mentioned instruction receiving unit 202 receives an instruction outputting the predetermined signal to the communication apparatuses 200 allocated to a desired time slot, which is transmitted by the communication processing device 100, the signal transmitting unit 204 outputs the predetermined signal at the time when the time slot designated by the instruction has the same value as the slot counter of the communication apparatuses 200 or the slot counter has a predetermined value, for example, 0 as the result of operations of the communication apparatuses 200 by the instruction. When the predetermined signal is the random number, for example, the signal transmitting unit 204 produces a random number, transmits the produced random number, and stores the random number in the storage medium such as the memory. The signal transmitting unit 204 can be realized by the wireless communication section or the wired communication section. The signal transmitting unit 204 may have a configuration for generating or acquiring the predetermined signal. The configuration can be generally realized by the MPU or the memory. A processing procedure thereof is generally realized by software, which is stored in the recording medium such as the ROM. However, the processing procedure thereof may be realized by hardware (a dedicated circuit).

The identifying information transmitting unit 205 transmits the identifying information in accordance with the instruction from the communication processing device 100. Specifically, when the instruction receiving unit 202 receives the identifying information transmission instruction, the identifying information transmitting unit 205 judges whether or not the identifying information transmission instruction is an instruction for the identifying information transmitting unit 205, acquires the identifying information from the identifying information storing unit 201 when the identifying information is the instruction for the identifying information transmitting unit 205, and transmits the identifying information. For example, when the identifying information transmission instruction includes the predetermined signal transmitted by the communication apparatuses 200, for example, the random as the factor, it is judged whether or not the same predetermined signal as the predetermined signal is stored in a memory in which the signal transmitting unit 204 accumulates the predetermined signal. Then, when it is judged that the same predetermined signal is stored in the memory in which the signal transmitting unit 204 accumulates the predetermined signal, the identifying information transmitting unit 205 transmits the identifying information. The identifying information transmitting unit 205 can be realized by the wireless communication section or the wired communication section. The identifying information transmitting unit 205 may include the MPU or the memory for performing judgment.

A configuration in which the communication processing device 100 such as the RFID tag reader/writer or the communication apparatus 200 such as the RFID tag performs a general operation is the known technology. Therefore, a description of the configuration is omitted.

Next, the operation of the communication processing device 100 will be described with reference to a flowchart of FIG. 2. Here, it is described a case in which the RFID tag reader/writer is used as the communication processing device 100, the time slot is used as the segment, and the RFID tag is used as the plurality of communication apparatuses.

(Step S201) The instruction transmitting unit 101 acquires an initial number of segments serving as an initial value of the number of segments. The instruction transmitting unit 101, for example, may read the initial number of segments previously stored in the memory and it may acquire the initial number of segments received by an input section such as a keyboard or the like. The initial number of segments, that is, an initial number of slots may be any value, but when the number of communication apparatuses in the communicatable area, that is, the number of tags is approximately known, it is preferable to set the number of segments which can be most efficiently updated.

(Step S202) The communication processing device 100 executes one sequence of the anti-collision process. The process will be later described with reference to FIG. 3. The collision number acquiring unit 103 acquires the number of collisions by the process. The reception unit 102 acquires the identifying information and the number of acquired identifying information.

(Step S203) The communication processing device 100 judges whether or not the number of collisions acquired in Step S202 is 0. The judgment may be performed by any processing unit of the communication processing device 100 such as the collision number acquiring unit 103 or the like. When the number of collisions is not 0, the process proceeds to Step S204 and when the number of collisions is 0, the communication processing device ends the process.

(Step S204) The communication apparatus number estimating unit 104 estimates the number of communication apparatuses which are communicatable with the communication processing device 100 by using the number of segments designated by the segment number designation instruction transmitted in Step S202 and the number of collisions acquired in Step S202. The process will be later described with reference to FIG. 4.

(Step S205) The communication processing device 100 subtracts the number of communication apparatuses which acquire the identifying information acquired in Step S202 from the number of communication apparatuses estimated in Step S204. The process may be performed by any processing unit of the communication processing device 100 such as the communication apparatus number estimating unit 104, the segment number acquiring unit 105, or the like. In addition, the process is a process for more accurately estimating the number of communication apparatuses. The process and a process of Step S206 may be omitted as needed.

(Step S206) The communication processing device 100 judges whether or not the number of communication apparatuses obtained by subtraction of Step S205 is 0. When the number of communication apparatuses is 0, the communication processing device 100 ends the process and when it is not 0, the process proceeds to Step S207. The process may be performed by any processing unit of the communication processing device 100 such as the segment number acquiring unit 105, or the like.

(Step S207) The expected value acquiring section 1051 of the segment number acquiring unit 105 acquires the number of communication apparatuses which are communicatable without occurrence of the collision when the number of segments is changed and the communication apparatus 200 serving as the tag corresponding to the number of communication apparatuses estimated in Step S204, for example, the communication apparatuses 200 corresponding to the number of communication apparatuses obtained by the subtraction of Step S205 are allocated to each of the segments, for example, to each of the slots for each number of segments. The process of acquiring the expected values will be later described with reference to FIG. 6.

(Step S208) The evaluated value calculating section 1052 calculates evaluated values for each number of segments from the expected values acquired in Step S207. For example, the evaluated value calculating section 1052 calculates the evaluated values by dividing the expected values by the number of segments corresponding thereto.

(Step S209) The corresponding segment number acquiring section 1053 acquires the number of segments corresponding to an evaluated value having the highest valuation out of the evaluated values calculated in Step S208.

(Step S210) The segment number updating unit 106 updates the number of segments designated by the segment number designation instruction with the number of segments acquired in Step S209. Then, the process returns to Step S202.

Figure 2:
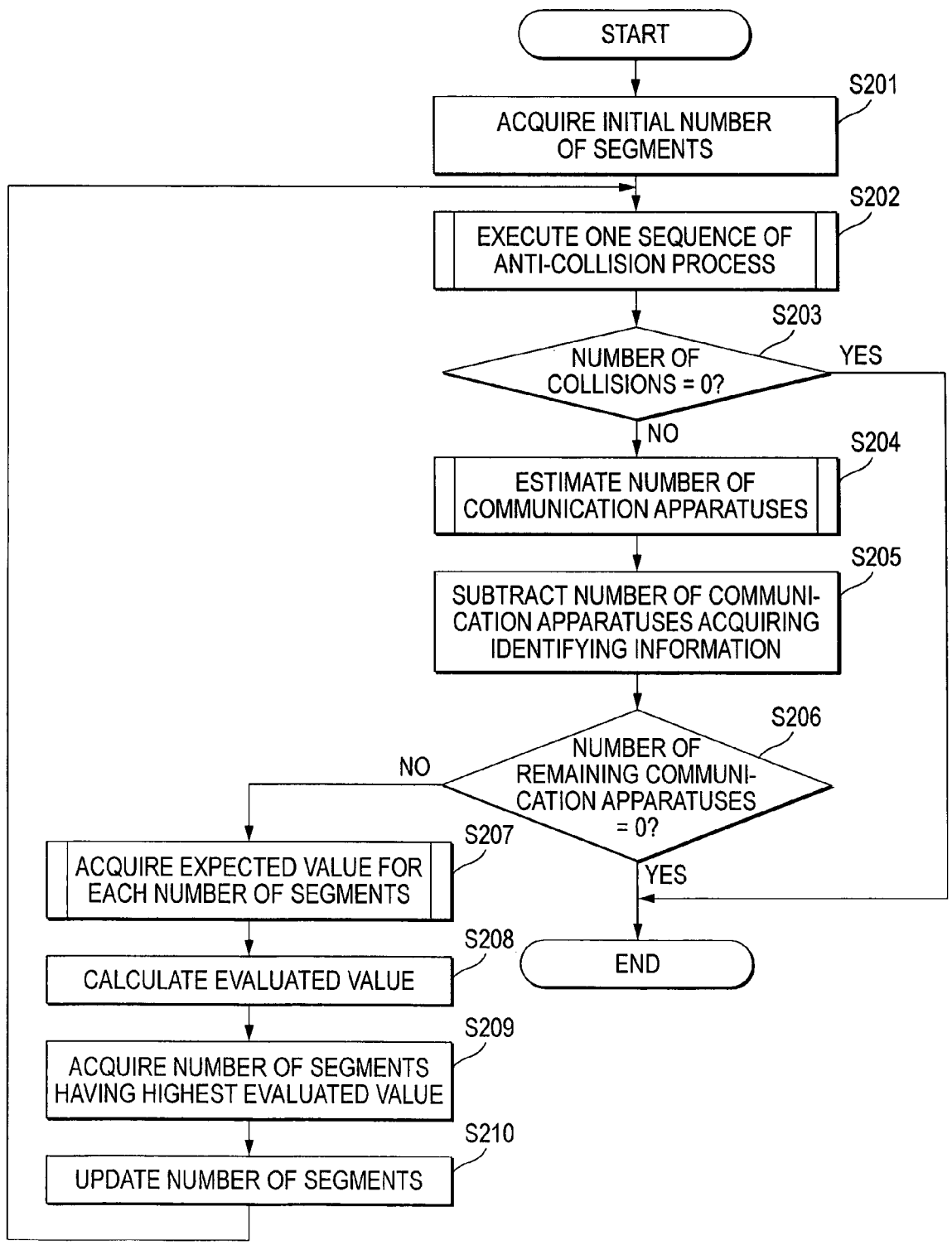
FIG. 2 is a flowchart illustrating an operation of a communication processing device according to the embodiment of the invention.

In the flowchart of FIG. 2, the communication processing device 100 may perform a process of trying to communicate with the communication apparatus 200 again in consideration of occurrence of a reading miss or a communication miss before ending the process.

In the flowchart of FIG. 2, the process is ended by an interrupt such as power-off or process ending.

Next, a detailed description of one sequence of the anticollision process shown in Step S202 of the flowchart of FIG. 2 will be given with reference to a flowchart of FIG. 3.

(Step S301) The instruction transmitting unit 101 acquires the segment number designation instruction and transmits the segment number designation instruction. The instruction transmitting unit 101 transmits the segment number designation instruction designating an initial number of segments until the number of segments is updated from an initial value and transmits the segment number designation instruction designating the updated number of segments after the number of segments is updated.

(Step S302) The communication processing device 100 substitutes 1 into a counter n. In addition, the communication processing device 100 substitutes 0 into the number of collisions k and the number of received identifying information m. The processes may be performed by any processing unit of the communication processing device 100 such as the reception unit 102, the collision number acquiring unit 103, or the like.

(Step S303) The reception unit 102 judges whether or not a predetermined signal is received. For example, the predetermined signal is a random number for identifying a tag, which is transmitted from the tag serving as the communication apparatus 200. Here, for example, the communication apparatus 200 allocated to a first segment outputs the predetermined signal as a signal allocated to the first segment, for example, a trigger. When the predetermined signal is received, the process proceeds to Step S304 and when the predetermined signal is not received, the process proceeds to Step S308.

(Step S304) The collision number acquiring unit 103 judges whether or not the collision occurs from the predetermined signal received in Step S303. When the collision does not occur, the process proceeds to Step S305 and when the collision occurs, the process proceeds to Step S311.

(Step S305) The identifying information transmission instruction transmitting unit 107 transmits the identifying information transmission instruction. For example, in Step S303, the identifying information transmission instruction transmitting unit 107 transmits the identifying information transmission instruction in which the random number serving as the predetermined signal for identifying the communication apparatus 200 is set to the factor.

(Step S306) The reception unit 102 receives the identifying information transmitted from the communication apparatus 200 corresponding to the identifying information transmission instruction transmitted in Step S305. The reception unit 102 accumulates the received identifying information in the storage medium such as the memory not shown, for example.

(Step S307) The reception unit 102 increments the number of received identifying information m by 1.

(Step S308) The communication processing device 100 judges whether or not the counter n is the number of segments designated by the segment number designation instruction. When the counter n is not the number of segments, the process proceeds to Step S309 and when the counter n is the number of segments, the process returns to an upper function.

(Step S309) The communication processing device 100 increments the counter n by 1.

(Step S310) The instruction transmitting unit 101 outputs an instruction outputting a predetermined signal to a communication apparatus allocated to the subsequent segment. For example, as described later, when the RFID tag serving as the communication apparatus 200 is configured to output the predetermined signal for the value of the counter having 0, the instruction transmitting unit 101 transmits an instruction decrementing the value of the slot counter by 1. Then, the process returns to Step S303.

(Step S311) The collision number acquiring unit 103 increments the number of collisions k by 1. In addition, the process proceeds to Step S308.

In a case that only when the instruction outputting the predetermined signal is received from the instruction transmitting unit 101, the communication apparatus 200 outputs the predetermined signal, there may be provided a step in which the instruction receiving unit 101 outputs the instruction outputting the predetermined signal to the a communication apparatus allocated the n-th segment between Step S302 and Step S303 instead of the process of Step S310.

Figure 3:
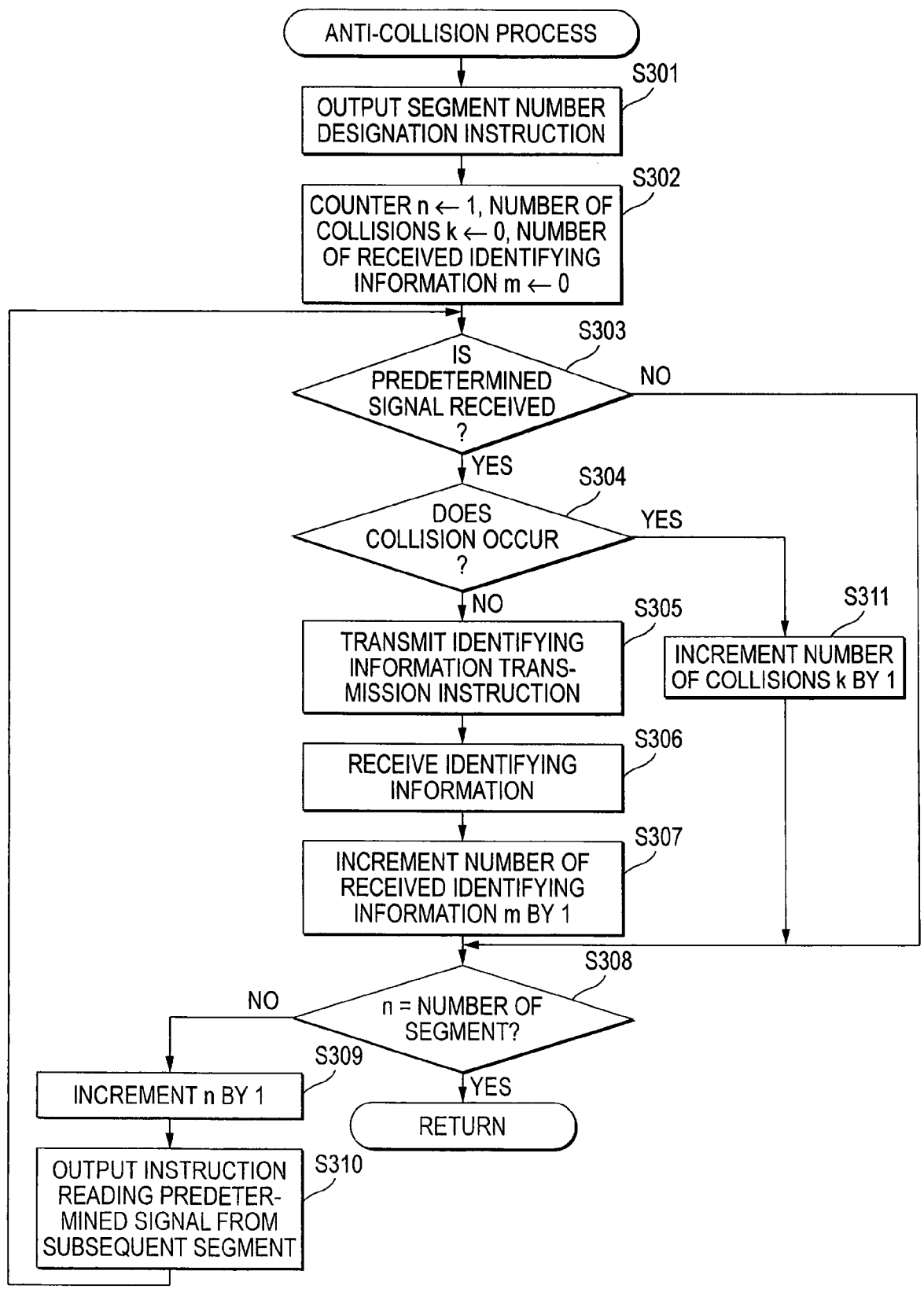
FIG. 3 is a flowchart illustrating the operation of the communication processing device according to the embodiment of the invention.

In the flowchart of FIG. 3, the process is ended by the interrupt such as the power-off or the process ending.

Next, a detailed description of a process of estimating the number of communication apparatuses 200 shown in Step S204 of the flowchart of FIG. 4, that is, the number of tags will be given with reference to a flowchart of FIG. 4. Here, the number of segments h is set to the number of segments designated by the segment number designation instruction transmitted in Step S202 of FIG. 2 and the number of collisions k is set to the number of collisions acquired in Step S202 of FIG. 2.

(Step S401) The probability acquiring section 1041 substitutes 1 into the number of communication apparatuses b.

(Step S402) The probability acquiring section 1041 substitutes 0 into the number of segments i to which no communication apparatus is allocated and the number of segments j in which only one communication apparatus is disposed, respectively. When the communication apparatuses of the number of communication apparatuses b are allocated to the segments of the number h of segments so that the only number of collisions k occurs, the probability acquiring section 1041 substitutes 0 into the number all_pat of all patterns, respectively.

(Step S403) The probability acquiring section 1041 substitutes a value of h−(i+j) into the number of collision occurrence segments col.

(Step S404) The probability acquiring section 1041 judges whether or not the number of collision occurrence segments col satisfies all four conditions of the following conditions 1 to 4 which are designated by the number of communication apparatuses b, the number of segments h, and the number of collisions k. The conditions represent a judgment process for omitting calculation for a case which cannot occur. The condition 1 represents a condition in which the number of collision occurrence segments col is not 0 and the number of segments j is the number of communication apparatuses b. The condition 2 represents a condition in which a value obtained by subtracting the number of segments j from the number of communication apparatuses b is more than twice the number of collision occurrence segments col. The condition 3 represents a condition in which the number of collision occurrence segments col is 0 or more. The condition 4 represents a condition in which the number of collision occurrence segments col is equal to the number of collisions k. When all the conditions are satisfied, the process proceeds to Step S405 and when all the conditions are not satisfied, the process proceeds to Step S410.

(Step S405) The probability acquiring section 1041 obtains COMBIN(h, i)×COMBIN(h−i, j) representing multiplication of a selection method of a segment to which no communication apparatus is allocated and a selection method of a segment to which only one communication apparatus is allocated. The multiplication is substituted into a variable pat. In the present embodiment, COMBIN(x, y) is the total combination number when here y communication apparatuses are selected at the timing of selecting y segments from x objects, here, the communication apparatuses, that is, xCy. In the present embodiment, PERMUT(x, y) is a permutation at the time of selecting y segments from x objects here the communication apparatuses, that is, xPy.

(Step S406) The probability acquiring section 1041 multiplexes all the selection patterns of the communication apparatus when only one of j communication apparatuses out of b communication apparatuses of each of j segments is allocated to each of j segments by the variable pat acquired in Step S405. In other words, pat×PERMUT(b, j) is calculated. The variable pat is updated with the multiplication.

(Step S407) The probability acquiring section 1041 calculates the number obtained by subtracting the number of communication apparatuses j of the segment in which only one communication apparatus is allocated from the number of all communication apparatuses b, that is, the number of patterns in which more than two communication apparatuses of (b−j) can be allocated to the collision occurrence patterns, that is, the number of collision occurrence patterns funcA(k, b−j). However, k indicates the number of collision occurrence segments col. A process of calculating funcA(k, b−j) will be later described with reference to FIG. 5.

(Step S408) The probability acquiring section 1041 calculates multiplication of the variable pat obtained in Step S406 and funcA(k, b−j) calculated in Step S407, and updates the variable pat with the multiplication.

(Step S409) The probability acquiring section 1041 increments the number of patterns all-pat by the value of the variable pat acquired in Step S408.

(Step S410) The probability acquiring section 1041 judges whether or not the number of segments j is equal to or more than the previous number of segments h. When the number of segments j is equal to or more than h, the process proceeds to Step S412 and when the number of segments j is less than h, the process proceeds to Step S417.

(Step S411) The probability acquiring section 1041 substitutes 0 into the number of segments j.

(Step S412) The probability acquiring section 1041 judges whether or not the number of segments i is equal to or more than the number of all the segments h. When the number of segments i is equal to or more than h, the process proceeds to Step S413 and when the number of segments i is less than h, the process proceeds to Step S418.

(Step S413) The probability acquiring section 1041 divides the number of patterns all_pat when the communication apparatuses corresponding to the number of communication apparatuses b are allocated to the segments corresponding to the number of segments h so that the number of collisions becomes k by the number of combinations hb for allocating the communication apparatuses corresponding to the number of communication apparatuses b to the segments corresponding to the number of segments h and calculates a probability p that the number of collisions will become k when the communication apparatuses 200 corresponding to the number of communication apparatuses b are allocated to the segments corresponding to the number of segments h. In other words, the probability acquiring section 1041 calculates the probability p=all_pat/hb. The probability acquiring section 1041 the calculated probability P in the storage medium such as the memory in correspondence with the number of communication apparatuses b used for calculation.

(Step S414) The probability acquiring section 1041 judges whether or not the number of communication apparatuses b is a predetermined value d. The predetermined value described here represents an upper-limit value of the number of communication apparatuses used for obtaining the probability p. In other words, the probability acquiring section 1041 obtains the probability p for each number of communication apparatuses by changing the number of communication apparatuses b from 1 to d (d is an integer of 1 or more). When the number of communication apparatuses b is the value d, the process proceeds to Step S415 and when the number of communication apparatuses b is not the value d, the process proceeds to Step S416. The number of communication apparatuses b is here changed from 1, but an initial value initiating a change of the number of communication apparatuses may be properly changed depending on a distribution status of the probability p.

(Step S415) The estimated communication apparatus number acquiring section 1042 acquires the value of the number of communication apparatuses b corresponding to the probability p having the maximum value out of the probabilities p acquired by the probability acquiring section 1041 in Step S413. The number of communication apparatuses b is the estimated number of communication apparatuses. Then, the process returns to an upper function.

(Step S416) The probability acquiring section 1041 increments the number of communication apparatuses b by 1. The process returns to Step S402.

(Step S417) The probability acquiring section 1041 increments the number of segments j by 1. Then, the process returns to Step S403.

(Step S418) The probability acquiring section 1041 increments the number of segments i by 1. Then, the process returns to Step S403.

Figure 4:
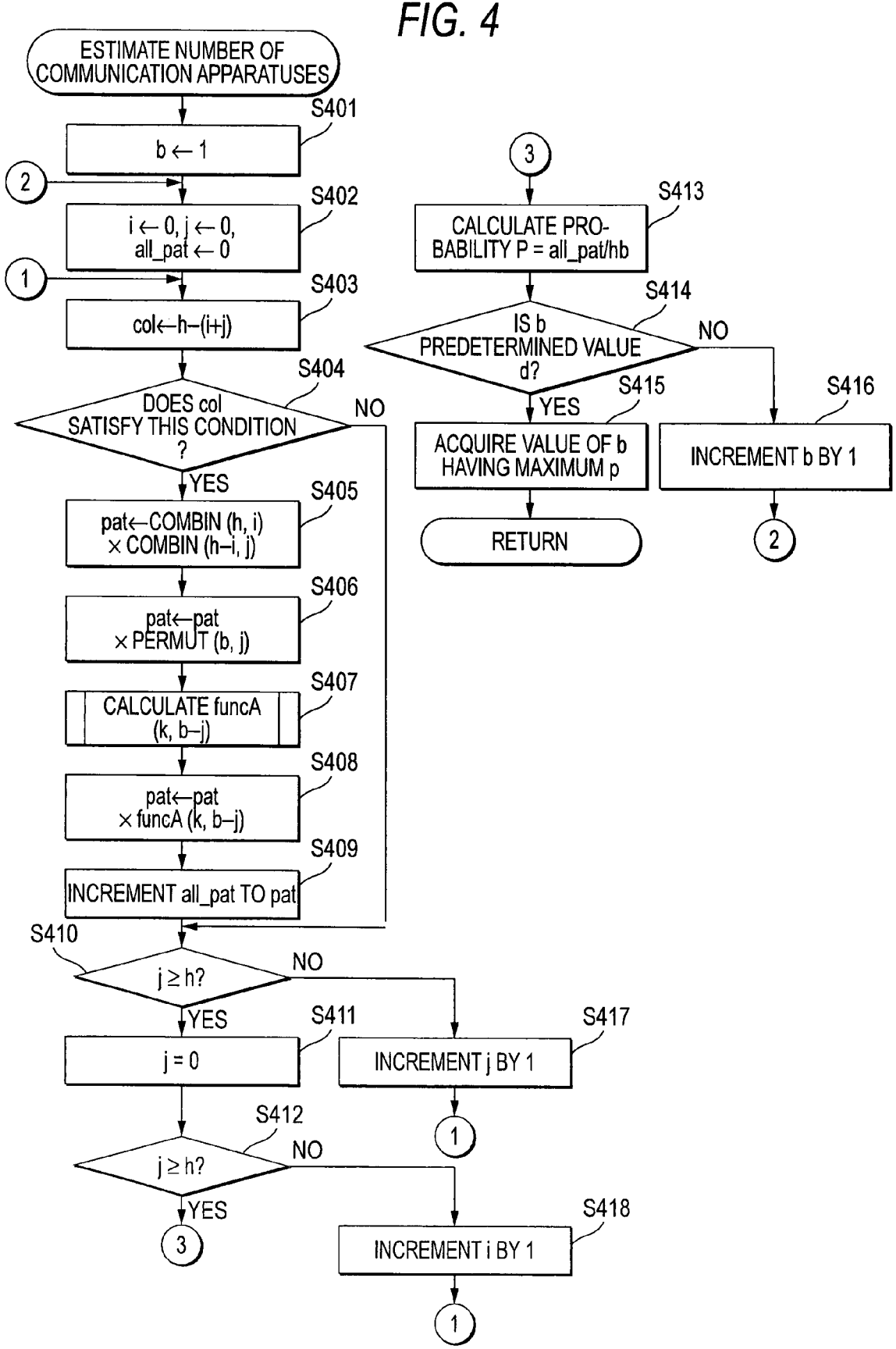
FIG. 4 is a flowchart illustrating the operation of the communication processing device according to the embodiment of the invention.

In the flowchart of FIG. 4, the process is ended by the interrupt such as the power-off or the process ending.

Figure 5:
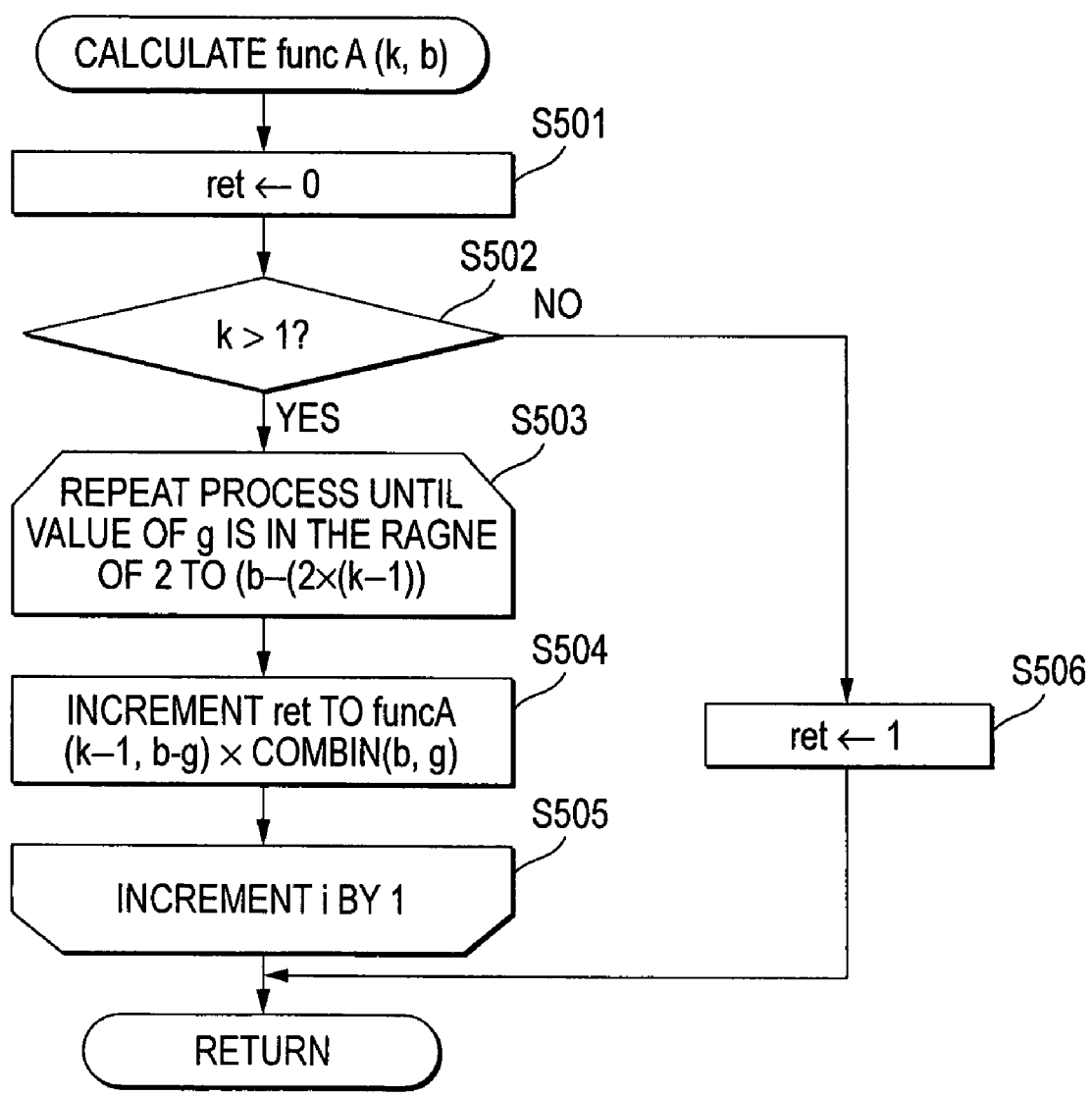
FIG. 5 is a flowchart illustrating the operation of the communication processing device according to the embodiment of the invention.

Next, a process of calculating the number of all the patterns funcA(k, b−j) in which k collisions occur, which is shown in Step S407 of the flowchart of FIG. 4 will be described with reference to a flowchart of FIG. 5. However, for an easy description, a process of obtaining funcA(k, b) by using the number of communication apparatuses b for convenience instead of the number of communication apparatuses (b−j) is described. As a result, in Step S407 of FIG. 4, funcA(k, b−j) is calculated by substituting (b−j) instead of b in a process described below. The process is a process of obtaining the number of combinations ret of tags so that at least two tags are included in each of the groups when the tags serving as b communication apparatuses 200 are allocated to k groups (Step S501) The probability acquiring section 1041 substitutes 0 into the number of combinations ret.

(Step S502) The probability acquiring section 1041 judges whether or not the number of collisions k is larger than 1. When the number of collisions k is larger than 1, the process proceeds to Step S503 and when the number of collisions k is not larger than 1, the process proceeds to Step S506.

(Steps S503 to S505) The probability acquiring section 1041 repeats the process of Step S504 while incrementing the value of a variable g by 1 until the value of the variable g reaches (b−2×(k−1)) from an initial value of 2. The process of Step S504 is a process of obtaining multiplication of COMBIN(b, g) representing the total number of combinations at the time of selecting g communication apparatuses from b communication apparatuses and funcA(k−1, b−g) representing the number of all the patterns in which (k−1) collisions occur from (b−g) communication apparatuses, and sequentially incrementing the number of combinations ret by the obtained value. In the process, the combination of the communication apparatuses when g communication apparatuses are allocated to one segment out of all the segments b is obtained by changing the variable g from 2 to (b−2×(k−1)) and the combination pattern of the other (b−g) communication apparatuses is obtained by funcA(k−1, b−g). The number of all the combinations is obtained when b communication apparatuses are allocated to k groups so that at least two communication apparatuses are included in each of the groups. Then, the acquired number of combinations ret is returned to an upper function.

(Step S506) The probability acquiring section 1041 substitutes 1 into the predetermined number ret and returns it to an upper function.

Next, a detailed description of a process of acquiring expected values of the number of communication apparatuses which are communicatable without occurrence of the collision when the communication apparatuses 200 corresponding to the number of communication apparatuses estimated in Step S204 are allocated to the segments for each number of segments shown in Step S207 of the flowchart of FIG. 2 will be given with reference to a flowchart of FIG. 6. Here, the number of communication apparatuses B is set to the number of communication apparatuses acquired in Step S205 of FIG. 2.

(Step S601) The expected value acquiring section 1051 substitutes 1 into the number of segments h.

(Step S602) The expected value acquiring section 1051 substitutes 0 into the number of segments in which no communication apparatus is disposed and the number of segments j in which only one communication apparatus is disposed, respectively. The expected value acquiring section 1051 substitutes 0 into the variable all_pat, respectively.

(Step S603) The expected value acquiring section 1051 substitutes a value of h−(i+j) into the number of collision occurrence segments col.

(Step S604) The expected value acquiring section 1051 judges whether or not the number of collision occurrence segments col satisfies all three conditions of the following conditions 1 to 3 which are designated by the number of communication apparatuses B. The conditions represent a judgment process for skipping calculation for a case which cannot occur. The condition 1 represents a condition in which the number of collision occurrence segments col is 0 and the number of segments j is not the number of communication apparatuses B. The condition 2 represents a condition in which a value obtained by subtracting the number of segments j from the number of communication apparatuses B is more than twice the number of collision occurrence segments col. The condition 3 represents a condition in which the number of collision occurrence segments col is 0 or more. When all the conditions are satisfied, the process proceeds to Step S605 and when all the conditions are not satisfied, the process proceeds to Step S611.

(Step S605) The expected value acquiring section 1051 obtains COMBIN(h, i)×COMBIN(h−i, j) representing multiplication of a selection method of a segment in which no communication apparatus 200 is disposed and a selection method of a segment in which only one communication apparatus 200 is dispose. The multiplication is set to the variable pat.

(Step S606) The expected value acquiring section 1051 multiplies all the selection patterns of the communication apparatus 200 when only one of j communication apparatuses out of B communication apparatuses 200 is allocated to each of j segments by the variable pat acquired in Step S605. In other words, pat×PERMUT(B, j) is calculated. The variable pat is updated with the multiplication.

(Step S607) The expected value acquiring section 1051 calculates the number of patterns in which more than two communication apparatuses corresponding to the number obtained by subtracting the number of communication apparatuses j of the segment to which only one communication apparatus 200 is allocated from the number of all communication apparatuses b are disposed in the segments in which the collisions corresponding to the number of segments col occur, that is, the number of collision occurrence patterns funcA(col, B−j). A process of calculating funcA(col, B−j) is the same as a process of substituting the number of segments col for k and B–j for b in the process shown in FIG. 5. Accordingly, a description thereof is omitted.

(Step S608) The expected value acquiring section 1051 calculates multiplication of the variable pat obtained in Step S606 and funcA(col, B–j) calculated in Step S607, and updates the variable pat with the multiplication.

(Step S609) The expected value acquiring section 1051 multiplies the number of segments j to which only one communication apparatus is allocated by the variable pat obtained in Step S609 and updates the variable pat with a value obtained by the multiplication.

(Step S610) The expected value acquiring section 1051 increments the number of patterns all_pat by the value of the variable pat acquired in Step S609.

(Step S611) The expected value acquiring section 1051 judges whether or not the number of segments j is equal to or more than the number of all the segments h. When the number of segments j is equal to or more than h, the process proceeds to Step S612 and when the number of segments j is less than h, the process proceeds to Step S617.

(Step S612) The expected value acquiring section 1051 substitutes 0 into the number segments j.

(Step S613) The expected value acquiring section 1051 judges whether or not the number of segments i is equal to or more than the number of all the segments h. When the number of segments i is equal to or more than h, the process proceeds to Step S614 and when the number of segments i is less than h, the process proceeds to Step S618.

(Step S614) The expected value acquiring section 1051 divides the variable all_pat by the number of combinations hb for allocating the communication apparatuses corresponding to the number of communication apparatuses b to the number of segments h and calculates an expected value E of the number of communication apparatuses which are communicatable without occurrence of the collisions when the communication apparatuses corresponding to the number of communication apparatuses b are allocated to the segments corresponding to the number of segments h. The expected value acquiring section 1051 accumulates the number of segments h and the expected value E which correspond to each other in the storage medium such as the memory.

(Step S615) The expected value acquiring section 1051 judges whether or not the number of segments h is a predetermined value e. The predetermined value e described herein represents an upper limit value of the number of segments used for obtaining the expected value E. In other words, the number of segments h is here changed from 1 to e (e is an integer of 1 or more), thereby obtaining the expected value E for each number of communication apparatuses. The number of segments h is here changed from 1, but an initial value initiating a change of the number of segments may be properly changed depending on the acquired expected value E. When the number of segments h is the value e, the process returns to an upper function and when the number of segments h is not the value e, the process proceeds to Step S616.

(Step S616) The expected value acquiring section 1051 increment the number of segments h by 1. Then, the process returns to Step S602.

(Step S617) The expected value acquiring section 1051 increments the number of segments j by 1. Then, the process returns to Step S603.

(Step S618) The expected value acquiring section 1051 increments the number of segments i by 1. Then, the process returns to Step S603.

Figure 6:
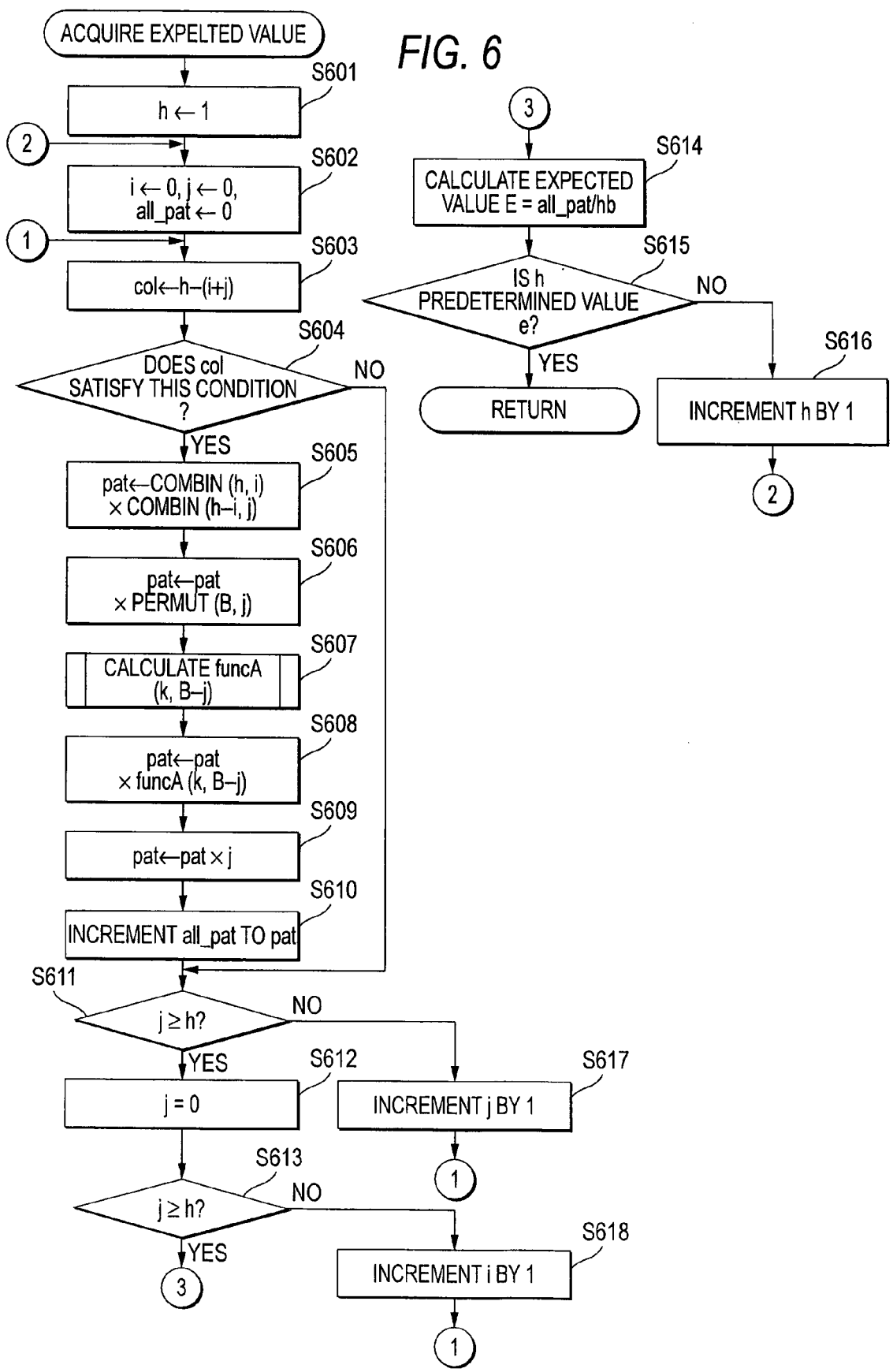
FIG. 6 is a flowchart illustrating the operation of the communication processing device according to the embodiment of the invention.

In the flowchart of FIG. 6, the process is ended by the interrupt such as the power-off or the process ending.

Figure 7:
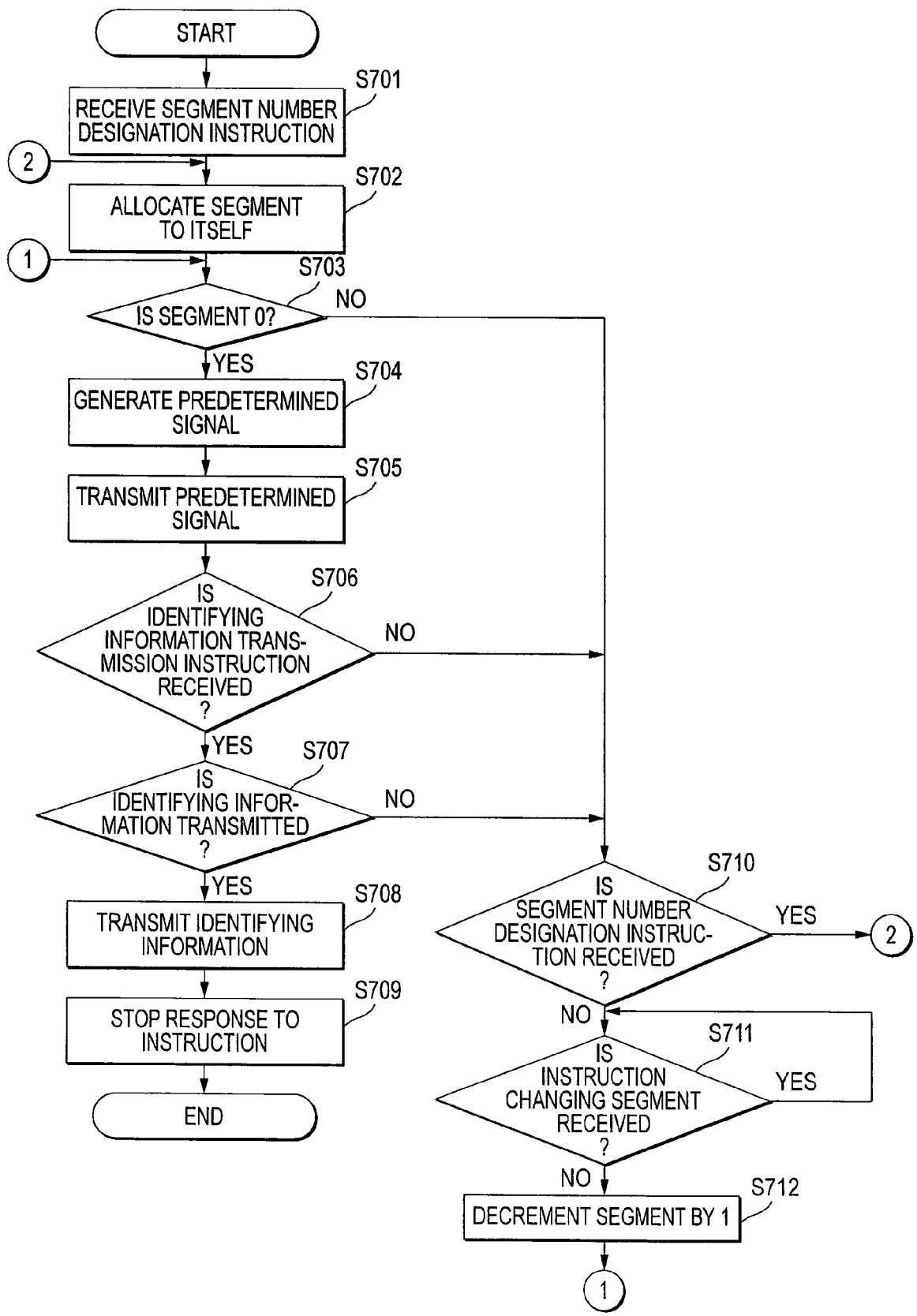
FIG. 7 is a flowchart illustrating the operation of the communication processing device according to the embodiment of the invention.

Next, an operation of the communication apparatus 200 will be described with reference to a flowchart of FIG. 7. The communication apparatus 200 is the RFID tag, for example and the number of segments is the number of slots, for example.

(Step S701) The instruction receiving unit 202 receives the segment number designation instruction.

(Step S702) The segment allocating unit 203 allocates the segment to the segment allocating unit 203 in accordance with the number of segments designated by the segment number designation instruction received in Step S701. Here, the segment allocating unit 203 allocates any one of segments of 0 to (h–i) when the number of segments is h. The segment allocating unit 203 substitutes the value of the allocated segment into the slot counter, for example.

(Step S703) The signal transmitting unit 204 judges whether or not the value of the segment allocated to the signal transmitting unit 204 is 0. Specifically, the signal transmitting unit 204 judges whether or not the value of the slot counter is 0. When the value of the slot counter is 0, the process proceeds to Step S704 and when the value of the slot counter is not 0, the process proceeds to Step S710.

(Step S704) The signal transmitting unit 204 generates a predetermined signal, concretely, a random number and temporarily stores it in the recording medium such as the memory.

(Step S705) The signal transmitting unit 204 transmits the predetermined signal generated in Step S704. The communication apparatus 200 outputs the predetermined signal when the value of the allocated segment is 0.

(Step S706) The identifying information transmitting unit 205 judges whether or not the instruction receiving unit 202 receives the identifying information transmission instruction. The identifying information transmission instruction is generally transmitted from the communication processing device 100 when the collision does not occur. When the instruction receiving unit 202 receives the identifying information transmission instruction, the process proceeds to Step S707 and when the instruction receiving unit 202 does not receive the identifying information transmission instruction, the process proceeds to Step S710.

(Step S707) The identifying information transmitting unit 205 judges whether or not the identifying information is transmitted. Specifically, the instruction receiving unit 202 judges whether or not the identifying information transmission instruction received by the instruction receiving unit 202 here includes a signal designating the instruction receiving unit 202, for example, the above-mentioned random number. Only when the identifying information transmission instruction includes the signal designating the instruction receiving unit 202, for example the random number, the identifying information transmitting unit 205 judges whether or not the identifying information is transmitted. When the identifying information is transmitted, the process proceeds to Step S708 and when the identifying information is not transmitted, the process proceeds to Step S710.

(Step S708) The identifying information receiving unit 205 reads the identifying information from the identifying information storing unit 201 and transmits the read identifying information.

(Step S709) The communication apparatus 200 stops a response to an external instruction. For example, the communication apparatus 200 stops the response by inverting an internal flag designating whether or not the communication apparatus 200 responds to the external instruction. Then, the process is ended.

(Step S710) The instruction receiving unit 202 judges whether or not a new segment number designation instruction is received. When the new segment number designation instruction is received, the process returns to Step S702 and when the new segment number designation instruction is not received, the process proceeds to Step S711.

(Step S711) The instruction receiving unit 202 judges whether or not an instruction changing the value of the segment is received. When the instruction changing the value of the segment is received, the process proceeds to Step S712 and when the instruction changing the value of the segment is not received, the process proceeds to Step S711. When a time in which the value of the segment is not received exceeds a predetermined time, the process may be ended by a time-out process.

(Step S712) The segment allocating unit 203 decrements the value of the allocated segment by 1. Specifically, the segment allocating unit 203 decrements the value of the slot counter by 1. When the value of the segment is 0, the segment allocating unit 203 sets the value of the segment to a predetermined value, for example, 2047 without decrementing the value of the segment. It is preferable that the value is sufficiently larger than the number of segments which may be designated by the segment number designation instruction. Then, the process returns to Step S703.

Figure 8:
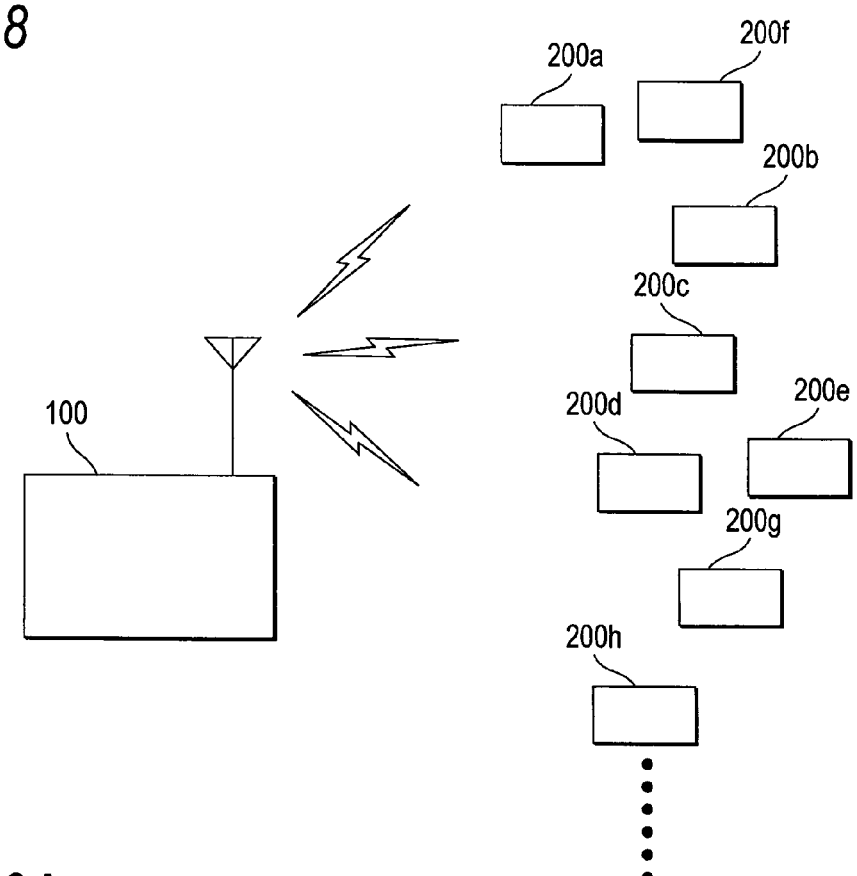
FIG. 8 is a schematic diagram of the communication system according to the embodiment of the invention.

Hereinafter, a detailed operation of the communication system according to the embodiment of the invention will be described. FIG. 8 is a schematic diagram of the communication system. Here, for example, a case in which the RFID tag reader/writer is used as the communication processing device 100 and the RFID tag is used as the plurality of communication apparatuses 200 is exemplified. Here, the plurality of communication apparatuses 200 are represented by the communication apparatuses 200a and 200b. However, the number of communication apparatuses 200 which exist in a scope communicatable with the communication processing device 100 is not previously known. In the detailed example, a case in which the segment is the time slot and the number of time slots is represented by 2Q (Q is a positive integer), for example and the value of Q is used as the number of segments is described.

Figure 9A:
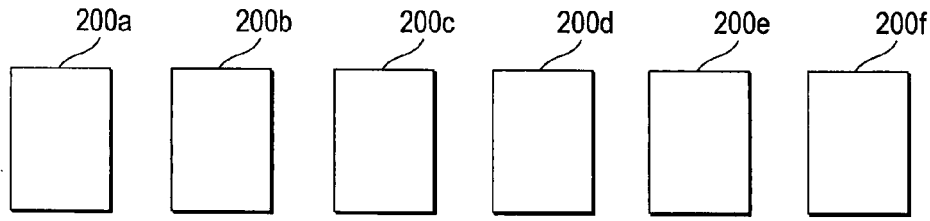
FIG. 9A is a diagram illustrating an anti-collision process according to the embodiment of the invention.

FIGS. 9A to 9J are diagrams illustrating the operation of the anti-collision process of the communication system according to the embodiment of the invention. In FIGS. 9A to 9J, the same reference numerals and signs as those of FIG. 8 represent constituent members equal to or corresponding to those of FIG. 8. Here, for easy description, as shown in FIG. 9A, a case in which the number of tags is 6 is described, but the number of tags is not considered.

First of all, the communication processing device 100 transmits a Query command serving as a command designating the number of time slots as the segment number designation instruction for designating the number of time slots. Here, the Query command designates the number of time slots as the value of Q and an initial value of Q is set to "3". In other words, the initial value of the number of the time slots is set to 8.

Figure 9B:
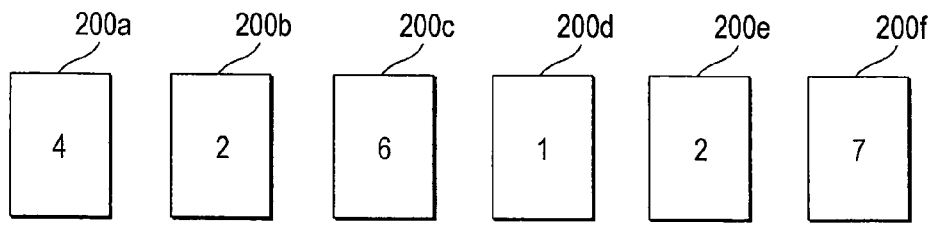
FIG. 9B is a diagram illustrating the anti-collision process according to the embodiment of the invention.

When the communication apparatus 200, positioned within the scope communicatable with the communication processing device 100 receives the Query command, the segment allocating unit 203 allocates any one of eight time slots to the segment allocating unit 203 depending on the number of time slots designated by the Query command. Specifically, as shown in FIG. 9B, any one of "0" to "7" is preserved in the slot counter. For example, the values of the slot counters of from the communication apparatus 200a to the communication apparatus 200f are set to "4", "2", "6", "1", "2", and "7".

Here, each of the communication apparatuses 200 generates predetermined information, for example, a random number of a hexadecimal number RN16 and transmits it when the value of the slot counter is 0. As shown in FIG. 9B, since the communication apparatus 200 in which the value of the slot counter is 0 does not exist, any communication apparatus 200 does not transmit a predetermined value.

Figure 9C:
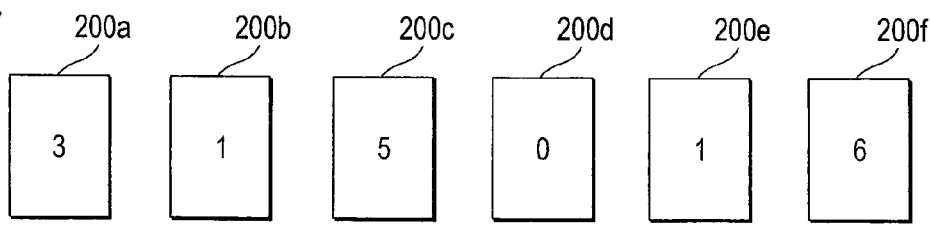
FIG. 9C is a diagram illustrating the anti-collision process according to the embodiment of the invention.

Next, when the communication processing device 100 transmits a QueryRep command serving as an instruction updating the number of time slots allocated to each of the communication apparatuses, concretely, an instruction decrementing the allocated number of time slots, the segment allocating unit 203 of each of the communication apparatuses 200 receiving the QueryRep command decrements the number of slot counters of each of the communication apparatuses 200 by 1 as shown in FIG. 9C.

Figure 9D:
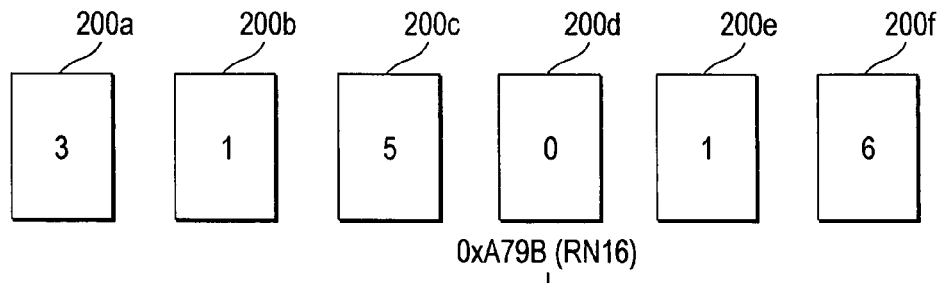
FIG. 9D is a diagram illustrating the anti-collision process according to the embodiment of the invention.

Accordingly, since the only value of the slot counter of the communication apparatus 200d becomes 0, the signal transmitting unit 204 of the communication apparatus 200d generates the random number RN16 and transmits the random number RN16 to the communication processing device 100 as shown in FIG. 9D. The random number is temporarily stored in the memory or the like. The random number RN16 is set to "0xA79B", for example.

When the reception unit 102 of the communication processing device 100 receives the predetermined signal, for example, the random number RN16 from the communication apparatus 200d, the random RN16 can be normally read. Accordingly, the collision number acquiring unit 103 judges that the collision does not occur. As the result, the identifying information transmission instruction transmitting unit 107 transmits an Ack command serving as an identifying information acquisition instruction in which the value of the RN16 of the reception unit is set to "0xA79B".

Figure 9E:
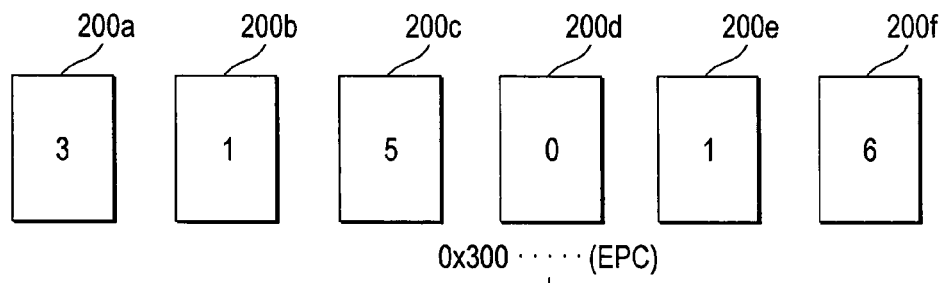
FIG. 9E is a diagram illustrating the anti-collision process according to the embodiment of the invention.
Figure 9F:
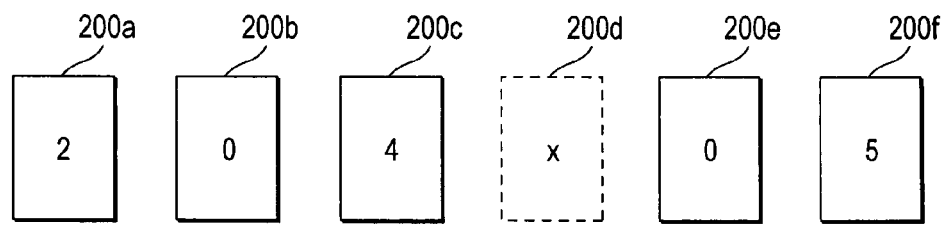
FIG. 9F is a diagram illustrating the anti-collision process according to the embodiment of the invention.

Each of the communication apparatuses 200 receiving an identifying information acquisition instruction judges whether or not the random number RN16 which is the same as "0xA79B" is stored. Since the identifying information transmitting unit 205 of the communication apparatus 200d stores the same random, "0xA79B" in a memory of the identifying information transmitting unit 205, the identifying information transmitting unit 205 reads identifying information accumulated in the identifying information storing unit 201, for example, EPC data "0x3000 . . . " and transmits it to the communication processing device 100 (FIG. 9E). Since the communication apparatus 200d transmits the identifying information, the communication apparatus 200d does not respond to the subsequent command from the communication processing device 100 by inverting the internal flag (FIG. 9F).

The communication processing device 100 receives the identifying information transmitted from the communication apparatus 200d in the reception unit 102 and accumulates the received identifying information. Accordingly, the identifying information of the communication apparatus 200d is acquired.

Next, when the communication processing device 100 transmits the same QueryRep command, the segment allocating unit 203 of each of the communication apparatuses 200 which receive the QueryRep command decrements the number of slot counters of each of the communication apparatuses 200 by 1.

Figure 9G:
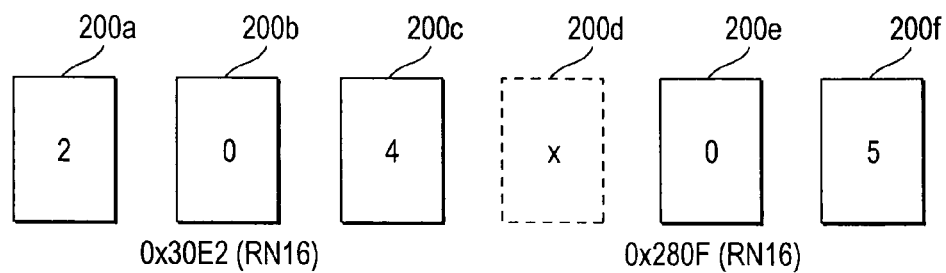
FIG. 9G is a diagram illustrating the anti-collision process according to the embodiment of the invention.

Accordingly, as shown in FIG. 9G, since the only values of the slot counters of the communication apparatus 200b and the communication apparatus 200e become 0, the communication apparatuses 200b and 200e generate the random number RN16 and transmits it to the communication processing device 100. The random number is temporarily stored in the memory. The random number RN16 of the communication apparatus 200b is "0x30E2" and the random number RN16 of the communication apparatus 200e is "0x280F", for example.

When the reception unit 102 of the communication processing device 100 receives the random numbers RN16 serving as a predetermined signal from the communication apparatuses 200b and 200e, the random numbers RN16 cannot be normally read due to collision between the random numbers. Accordingly, the collision number acquiring unit 103 judges that the collision occurs and increments the value of the counter k indicating that the collision occurs by 1. In this case, the identifying information transmission instruction transmitting unit 107 does not transmit the Ack command.

Since the identifying information is not transmitted to the communication apparatuses 200b and 200e, a process disabling the command to be received is not performed.

When the communication processing device 100 transmits the same QueryRep command, the segment allocating unit 203 of each of the communication apparatuses 200 receiving the QueryRep command decrements the value of slot counter of each of the communication apparatuses 200 by 1.

Figure 9H:
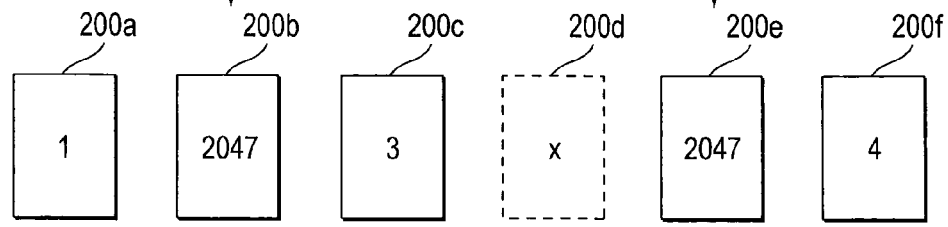
FIG. 9H is a diagram illustrating the anti-collision process according to the embodiment of the invention.

The communication apparatuses 200b and 200e in which the value of the slot counter is 0 sets the value of the slot counter to a predetermined value, "2047" (FIG. 9H).

After this, the same process is repeated, and when a process corresponding to transmission of (the number of time slots–1)-th QueryRep command is ended, one sequence of the anti-collision process is ended.

Figure 9I:
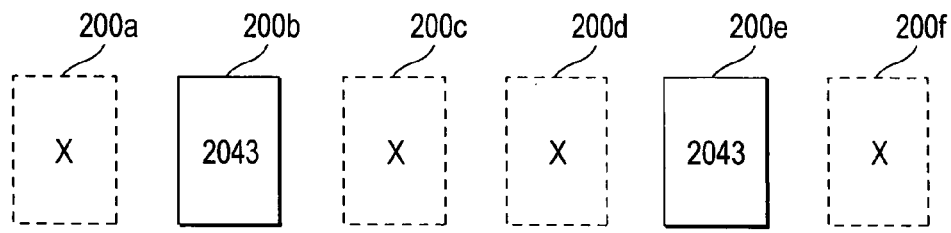
FIG. 9I is a diagram illustrating the anti-collision process according to the embodiment of the invention.
Figure 9J:
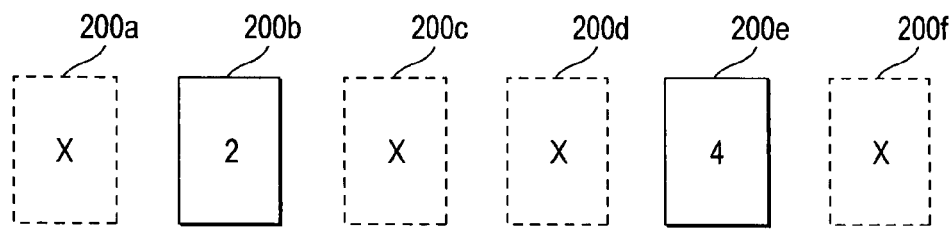
FIG. 9J is a diagram illustrating the anti-collision process according to the embodiment of the invention.

At this time, when the collision does not occur in the one sequence, all the processes are ended, but when the collision occurs as shown in FIG. 9I, the number of time slots is updated and a sequence of the anti-collision process is repeated for the communication apparatuses 200b and 200e in which the collision occurs as shown in FIG. 9J.

Hereinafter, a process of updating the number of time slots will be described.

First of all, the probability acquiring section 1041 of the communication apparatus number estimating unit 104 estimates the number of communication apparatuses 200 which are communicatable with the communication processing device 100 by using Q setting the number of time slots h used in a preceding sequence and the number of collisions k acquired in the preceding sequence after the one sequence of the anti-collision process is ended.

In other words, the number of communication apparatuses b is changed and a probability in which the number of collisions becomes k in the value of Q used in the preceding sequence is acquired. Consequently, it is possible to obtain the number of communication apparatuses b having the highest probability in which the number of occurring collisions becomes k in the value Q. It is estimated that the number of communication apparatuses b is the number of all the communication apparatuses which are communicatable with the communication processing device 100.

Specifically, all the combinations when the communication apparatuses 200 are allocated to the time slots are acquired and are added to all the combinations when slots corresponding to the number acquired by subtracting the number of collision occurrence slots k from the number of time slots h are allocated to any one of slots to which no communication apparatus 200 is allocated or slots to which only one communication apparatus 200 is allocated. Accordingly, it is possible to obtain all the allocation patterns when the communication apparatuses 200 are allocated to the time slots so that a condition in which the number of time slots is h, the number of collisions is k, and the number of communication apparatuses is b is satisfied It is possible to obtain the probability in which the number of collisions is k in a predetermined value of Q when the number of communication apparatuses is b by dividing the value acquired by the addition by all the allocation patterns when only one of b communication apparatuses 200 is allocated to h time slots.

It is possible to obtain a relationship between the value of the number of communication apparatuses b and the probability in which the number of collisions becomes k when b communication apparatuses are allocated to the number of time slots h set by the predetermined value of Q by repeating the process until the number of communication apparatuses b becomes from 1 to a predetermined value.

The estimated communication apparatus number acquiring section 1042 acquires the value of the number of communication apparatuses b as the value of the number of communication apparatuses estimated when the number of collisions is k in the value of Q used in the preceding sequence.

Figure 10:
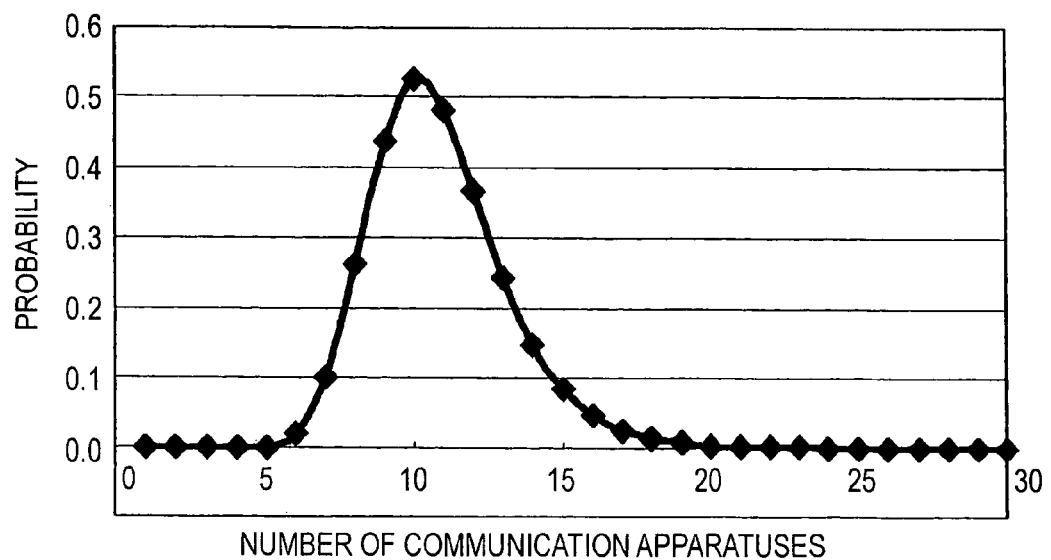
FIG. 10 is a diagram illustrating a relationship between the number of communication apparatuses and a probability according to the embodiment of the invention.

For example, FIG. 10 illustrates a relationship between the number of communication apparatuses b and a probability in which such status occurs when the value of Q designated in the preceding sequence of the anti-collision process is "3", that is, the number of time slots is 8 and the number of collisions acquired in the preceding sequence of the anti-collision process is "3". The number of communication apparatuses having the highest probability, that is, "10" is set as the estimated number of communication apparatus in consideration of the relationship shown in FIG. 10.

Next, for example, the estimated communication apparatus number acquiring section 1042 can acquire the number of communication apparatus B estimated to be a processing target, that is, the number of communication apparatuses in which the identifying information is not acquired in the subsequent sequence anti-collision process by subtracting the number of identifying information acquired in the preceding sequence of the anti-collision process from the estimated number of communication apparatuses.

For example, when the value of Q designated in the preceding sequence of the anti-collision process is "7", the number of collisions acquired therein is "4", and the number of acquired identifying information is "1" when it is estimated by the communication apparatus number estimating unit 104 that the number of communication apparatuses is "30", 29 communication apparatuses is estimated to be the processing target in the subsequent anti-collision process.

Next, the expected value acquiring section 1051 calculates an expected value of the number communication apparatuses which are communicatable without occurrence of the collision when B communication apparatuses estimated to be the processing target are allocated to the time slots having the number of slots corresponding to 2Q, that is, the expected value E of the number of communication apparatuses which can receive the random number or the identifying information from the communication apparatuses 200 without occurrence of the collision while changing the value of Q. Here, first of all, the results of multiplication of all the patterns when one value is substituted into the value of Q and B communication apparatuses are allocated to the time slots and the number of communication apparatuses which are communicatable in the patterns are calculated, whereby the total of the results are calculated. The total is divided by the number of patterns when B communication apparatuses are allocated to 2Q time slots, thereby calculating the expected value E. Even when other values are substituted into the value of Q, the expected value E is sequentially calculated, thereby obtaining the relationship between the value of Q and the expected value E when the number of communication apparatuses is B.

Next, the evaluated value acquiring section 1052 divides the expected value E acquired by the expected value acquiring section 1051 by the number of time slots 2Q corresponding thereto to obtain an evaluated value V. A relationship between the number of time slots h and the evaluated value V is acquired. The evaluated value V is a value used for valuation for obtaining a condition in which the anti-collision process can be efficiently performed. The evaluated value V is set to optimize the anti-collision process by considering that the expected value of the number of communication apparatuses which are communicatable without occurrence of the collision when the number of slots increases and the number of times in which the QueryRep command is executed in one sequence increases when the number of time slots increases.

For example, when the number of communication apparatuses B is 29, the correspondence relationship of the value of Q, the expected value E, and the evaluated value V is shown in FIG. 11.

The corresponding segment number acquiring section 1053 acquires the value of Q corresponding to the evaluated value V having the highest valuation, here, the largest value in the correspondence relationship between the evaluated value V acquired by the evaluated value calculating section 1052 and the values of Q as the value of Q used in the subsequent sequence of the anti-collision process.

For example, in FIG. 11, when the value of Q is "5", the evaluated value V has the largest value, whereby the corresponding segment number acquiring section 1053 acquires "5" as the value of Q.

The segment number updating unit 106 updates the value of Q designated by the segment number designation instruction with the value of Q acquired by the corresponding segment number acquiring section 1053.

After then, the sequence of the anti-collision process described above is repeated and the process is ended at the time when the collision does not occur in one sequence.

As described above, according to the embodiment of the invention, since the number of communicatable communication apparatuses is estimated in accordance with the number of collisions detected in one sequence of the anti-collision process and the number of segments designated in the sequence, the number of segments corresponding to the number of communication apparatuses is acquired, and the number of segments designated in the subsequent sequence of the anti-collision sequence is updated with the number of segments, setting of the number of segments can be optimized in accordance with the estimated number of communication apparatuses. Accordingly, it is possible to shorten a time required for the anti-collision process.

Second Embodiment

In the present embodiment, a process of estimating the number of communication apparatuses, which is performed by means of calculation carried out by the communication apparatus number estimating unit 104 in the first embodiment is acquired by using prepared information representing the correspondence relationship of the number of segments, the number of collisions, and the number of communication apparatuses estimated from the number of segments and the number of collisions calculated by calculation. A process in which the segment number acquiring unit 105 acquires the new number of segments corresponding to the number of communication apparatuses estimated by calculating the evaluated value, which is performed by means of calculation is acquired by using predetermined information representing the correspondence relationship between the number of communication apparatuses and the number of segments.

Figure 12:
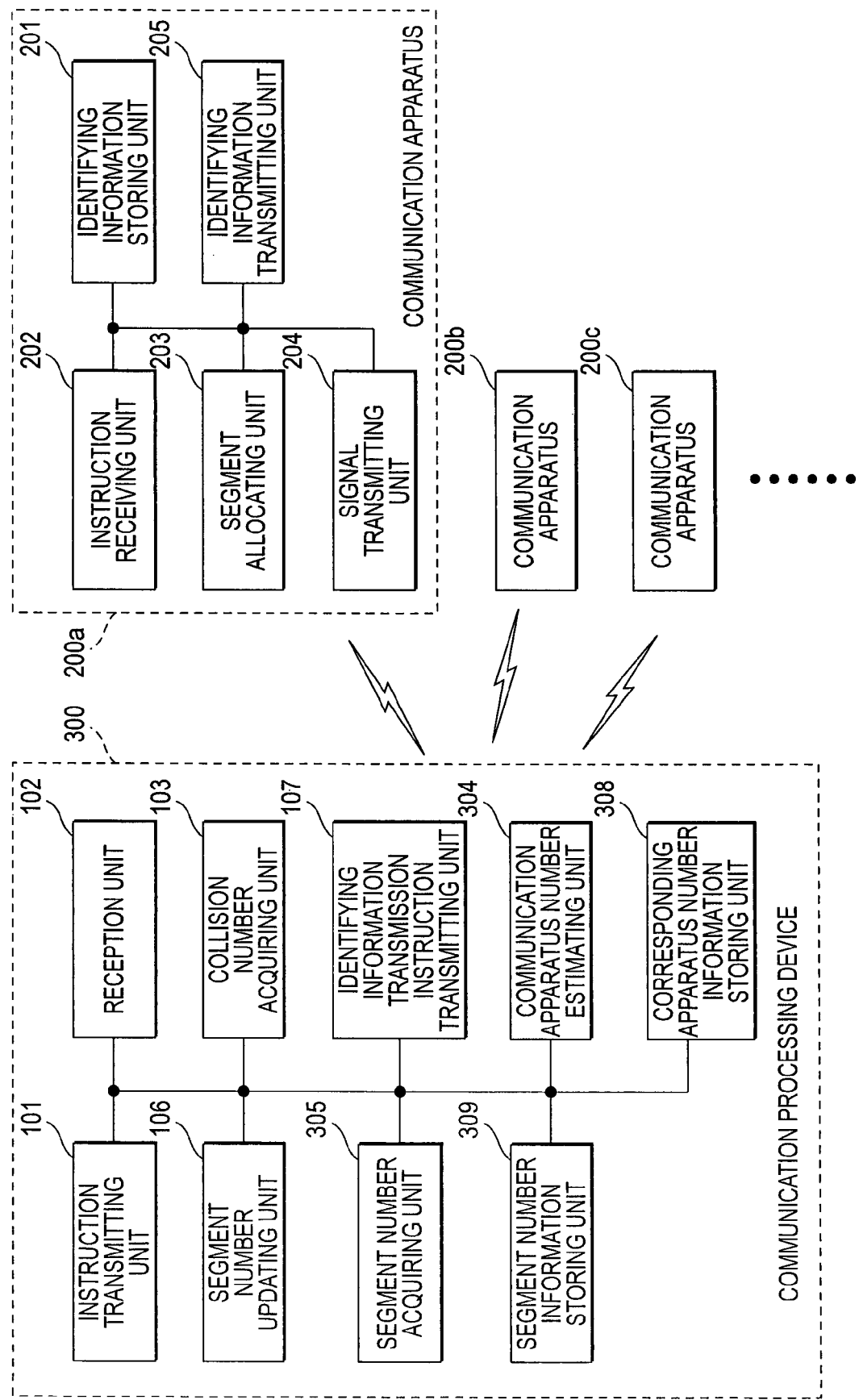
FIG. 12 is a block diagram of a communication system according to a second embodiment of the invention.

FIG. 12 is a block diagram of the communication system according to the embodiment of the invention. The communication system according to the embodiment of the invention includes a communication processing device 300 and the plurality of communication apparatuses 200.

Configurations and operations of the plurality of communication apparatuses 200 are the same as those of the first embodiment. Accordingly, a detailed description thereof is here omitted.

The communication processing device 300 includes a communication apparatus number estimating unit 304 and a segment number acquiring unit 305 instead of the communication apparatus number estimating unit 104 and the segment number acquiring unit 105 in the communication processing device 1 described in the first embodiment. In addition, the communication processing device 300 includes a corresponding apparatus number information storing unit 308 and a segment number information storing unit 309. In other words, the communication processing device 300 includes the instruction transmitting unit 101, the reception unit 102, the collision number acquiring unit 103, the communication apparatus number estimating unit 304, the segment number acquiring unit 305, the segment number updating unit 106, the identifying information transmission instruction transmitting unit 107, the corresponding apparatus number information storing unit 308, and the segment number information storing unit 309.

Configurations and operations of the instruction receiving unit 101, the reception unit 102, the collision number acquiring unit 103, the segment number updating unit 106, and the identifying information transmission instruction transmitting unit 107 are the same as those in the first embodiment. Accordingly, a detailed description thereof is omitted.

Information on the number of corresponding apparatuses corresponding to 1 or more as information representing the correspondence relationship of the number of segments, the number of collisions, and the number of plurality of communication apparatuses is stored in the corresponding apparatus number information storing unit 308. Specifically, the number of segments allocated to plurality of communication apparatuses 220, the number of collisions when communication is performed for each segment, and the number of communication apparatus serving as a communication target clearly specified by the number of segments and the number of collisions which correspond to one another are stored in the corresponding apparatus number information storing unit 308. For example, the number of segments, the number of collisions, and the number of plurality of communication apparatuses are stored as one record. Specifically, the information on the number of corresponding apparatuses represents the correspondence relationship of the number of segments, the number of collisions, and the number of plurality of communication apparatuses estimated to be communicatable with the communication processing device 300 from the number of segments and the number of collisions. More specifically, the information on the number of corresponding apparatuses represents the correspondence relationship of the number of segments, the number of collisions, and the number of plurality of communication apparatuses having the highest probability to satisfy the number of segments and the number of collisions as a condition. For example, the information on the number of corresponding apparatuses can be acquired by performing the process of obtaining the number of communication apparatuses which the communication apparatus number estimating unit 104 described in the first embodiment estimates by using the number of segments and the number of collisions for each of combinations when the number of segments and the number of collisions are changed, respectively. A computer allows the communication processing device such as the RFID tag reader/writer to repeatedly execute a process of imaginarily reading the number of communication apparatuses by using software for simulation imaginarily realizing operations of the plurality of communication apparatuses, for example, the RFID tags. Accordingly, the information on the number of corresponding apparatuses may be acquired from a result of execution. Specifically, plurality of setups changing a combination of the number of segments, the number of collisions, and the number of communication apparatuses are prepared and a simulation process of reading the communication apparatus for each of the setups is executed. A probability in which a predetermined number of collisions occur is acquired from a result of the simulation process when the number of communication apparatuses is changed within a predetermined scope set for each of the setups and the number of communication apparatuses having the highest probability is acquired as the estimated number of communication apparatuses. A process of acquiring the number of communication apparatuses is executed in the same manner as the process described above even when the combination of the number of segments and the number of setups is changed and the information on the number of corresponding apparatuses is acquired. The information on the number of corresponding apparatuses may be acquired from a result acquired from the same test as the simulation by actually preparing the communication apparatus such as the RFID tag and the communication processing device such as the RFID tag reader/writer without use of the software for simulation. The non-volatile recording medium is suitable for the corresponding apparatus number information storing unit 308, but the corresponding apparatus number information storing unit 308 may be realized even by the volatile recording medium.

Information on the number of segments corresponding to 1 or more as the information representing the correspondence relationship between the number of plurality of communication apparatuses and the number of segments is stored in the segment number information storing unit 309. Specifically, the number of plurality of communication apparatuses and the number of segments which correspond to each other are stored in the segment number information storing unit 309. For example, the number of plurality of communication apparatuses and the number of segments which correspond to each other are stored as one record. The information on the number of segments represents a correspondence relationship between the number of communication apparatuses and the number of segments in which the anti-collision process is efficiently performed for the number of plurality of communication apparatuses. More specifically, the information on the number of segments represents a correspondence relationship between the number of plurality of communication apparatuses estimated by the communication apparatus number estimating unit 304 and the number of segments determined by an expected value of the number of communication apparatuses which are communicatable without occurrence of the collision and the number of segments when the plurality of communication apparatuses are allocated to the plurality of segments, that is, the number of segments determined by the above-mentioned evaluated value. For example, the information on the number of segments can be acquired by performing the process in which the segment number acquiring unit 305 acquires the number of segments by means of calculation means by using the number of communication apparatuses when the number of communication apparatuses is changed. A computer allows the communication processing device such as the RFID tag reader/writer to repeatedly execute a process of imaginarily reading the number of communication apparatuses by using software for simulation imaginarily realizing operations of the plurality of communication apparatuses, for example, the RFID tags. Accordingly, the information on the number of segments may be acquired from a result of execution. Specifically, plurality of setups changing a combination of the number of segments and the number of communication apparatuses are prepared and a simulation process of reading the communication apparatus for each of the setups is executed. An expected value of the number of communication apparatuses which are communicatable without occurrence of the collision for each combination of the number of segments and the number of communication apparatuses is acquired from a result of the simulation process. The evaluated value is calculated by substituting each of the acquired expected value into a desired valuation function. The information on the number of segments is acquired by acquiring the number of segments having the highest evaluated value for each number of communication apparatuses. The information on the number of corresponding apparatuses may be acquired from a result acquired from the same test as the simulation by actually preparing the communication apparatus such as the RFID tag and the communication processing device such as the RFID tag reader/writer without use of the software for simulation. The non-volatile recording medium is suitable for the segment number information storing unit 309, but the segment number information storing unit 309 may be realized even by the volatile recording medium.

The communication apparatus number estimating unit 304 estimates the number of plurality of communication apparatuses 200 corresponding to the number of segments designated by the segment number designation instruction and the number of collision acquired by the collision number acquiring unit 103 by using the information on the number of corresponding apparatuses stored in the corresponding apparatus number information storing unit 308. Specifically, the communication apparatus number estimating unit 304 reads the number of communication apparatuses specified by the number of segments designated by the segment number designation instruction and the number of collisions acquired by the anti-collision process to acquire the read number of communication apparatus out of the information on the number of corresponding apparatus as the estimated number of communication apparatuses. For example, when the number of segments, the number of collisions, and the number of communication apparatuses which correspond to one another are stored in one record in the information on the number of corresponding apparatuses, the communication apparatus number estimating unit 304 acquires the number of communication apparatuses included in a record in which the number of segments designated by the segment number designation instruction matches with the number of collisions acquired by the anti-collision process. The communication apparatus number estimating unit 304 can be generally by the MPU or the memory. A processing sequence of the communication apparatus number estimating unit 304 is generally realized by software, which is recorded in the recording medium such as the ROM. However, the processing sequence of the communication apparatus number estimating unit 304 may be realized by hardware (a dedicated circuit).

The segment number acquiring unit 305 acquires the number of segments corresponding to the number of communication apparatuses estimated by the communication apparatus number estimating unit by using the information on the number of segments stored in the segment number information storing unit 309. Specifically, the segment number acquiring unit 305 reads and acquires the number of segments clearly specified by a value corresponding to the number of communication apparatuses estimated by the communication apparatus number estimating unit 304 out of the information on the number of segments. In the present embodiment, in particular, the segment number acquiring unit 305 acquires the clearly specified number of segments by the number of communication apparatuses acquired by subtracting the number of communication apparatuses 200 in which the reception unit 102 receives the identifying information from the number of communication apparatuses 200 estimated by the communication apparatus number estimating unit 304 out of the information on the number of segments. For example, in the information on the number of segments, when the number of communication apparatuses and the number of segments are stored in one record, the segment number acquiring unit 305 acquires the number of communication apparatuses included in a record in which the number of corresponding communication apparatuses matches the number of communication apparatuses acquired by subtracting the number of communication apparatuses 200 in which the reception unit 102 receives the identifying information from the number of communication apparatuses estimated by the communication apparatus number estimating unit 304 out of the information on the number of segments. The segment number acquiring unit 305 can be generally realized by the MPU or the memory. A processing sequence of the segment number acquiring unit 305 is generally realized by software, which is recorded in the recording medium such as the ROM. However, the processing sequence of the segment number acquiring unit 305 may be realized by hardware (a dedicated circuit).

Next, an operation of the communication processing device according to the embodiment of the invention will be described with reference to a flowchart of FIG. 13. Further, in FIG. 13, the same reference numerals and signs as those of FIG. 2 represents steps equal to or corresponding to those of FIG. 2.

(Step S1301) The communication apparatus number estimating unit 304 acquires the number of communication apparatuses corresponding to the number of segments designate by the segment number designation instruction used in Step S202 and the number of collisions acquired in Step S202 by using the information on the number of corresponding apparatuses stored in the corresponding apparatus number storing unit 308. For example, the communication apparatus number estimating unit 304 acquires the number of communication apparatuses corresponding to the matching number of segments and the matching number of collisions by querying the number of segments and the number of collisions matching the number of segments designated by the segment number designation instruction used in Step S202 and the number of collisions acquired in Step S202 out of the numbers of segments and the numbers of collisions in the information on the number of corresponding apparatuses stored in the corresponding apparatus number information storing unit 308 as the estimated number of communication apparatuses.

(Step S1302) The segment number acquiring unit 305 acquires the number of segments corresponding to the number of communication apparatuses acquired by a result of the subtraction in Step S205 by using the information on the number of segments stored in the segment number information storing unit 309. For example, the segment number acquiring unit 305 acquires the number of segments corresponding to the matching number communication apparatuses by querying the number of communication apparatuses matching the number of communication apparatuses acquired in Step S205 out of the numbers of communication apparatuses in the segment number information stored in the segment number information storing unit 309.

Figure 13:
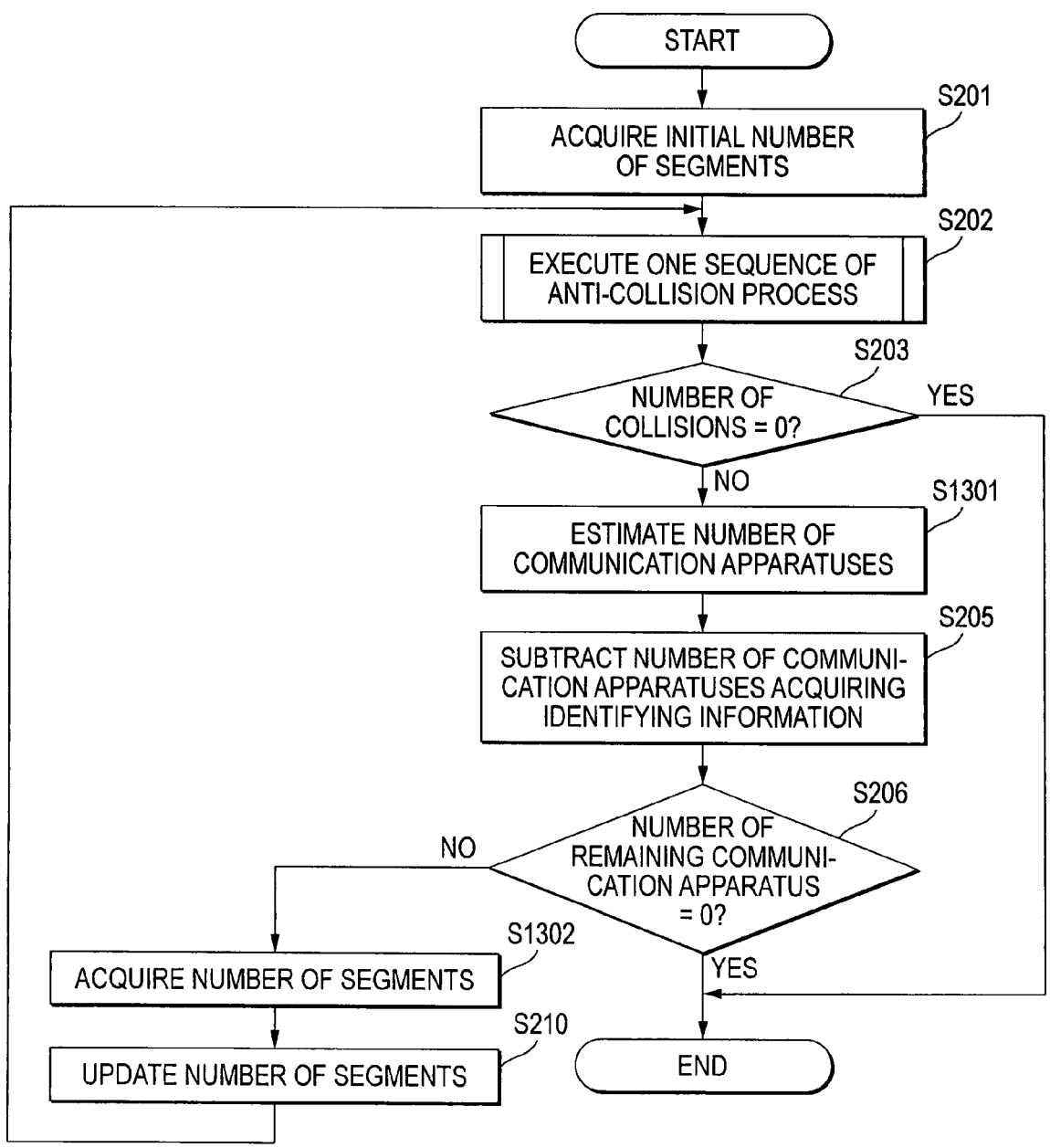
FIG. 13 is a flowchart illustrating an operation of the communication system according to the embodiment of the invention.

In the flowchart of FIG. 13, the process is ended by the interrupt such as the power-off or the process ending.

Next, an example of a method of acquiring the information on the number of corresponding apparatuses by calculation will be described with reference to a flowchart of FIG. 14. Here, a case in which the calculation is performed the communication apparatus number estimating unit 104 of the communication processing device 100 described in the first embodiment or devices having the same configuration as the communication apparatus number estimating unit 104 is described. In the figure, the same reference numerals and signs as those of FIG. 2 represent steps equal to or corresponding to those of FIG. 2.

(Step S1401) 1 is substituted into the number of segments h and 0 is substituted into the number of collisions k, respectively. The number of segments h and the number of collisions k disclosed herein are just used as the number of segments h and the number of collisions k in Step S204.

(Step S1402) The estimated number of communication apparatuses acquired in Step S207 is accumulated in the storage medium such as the memory, for example, the corresponding apparatus number storing unit 308 in correspondence with the number of collisions k and the number of segments h. Consequently, information accumulated in the storage medium becomes the information on the number of corresponding apparatuses.

(Step S1403) It is judged whether or not the number of collisions k is equal to or more than the number of segments h. When the number of collisions k is equal to or more than the number of segments h, the process proceeds to Step S1404 and when the number of collisions k is less than the number of segments h, the process proceeds to Step S1406.

(Step S1404) 0 is substituted into the number of collisions k.

(Step S1405) It is judged whether or not the number of segments h is equal to or more than a predetermined value. The predetermined value may become any value and is determined by a value expected to be an upper limit of the number of communication apparatuses. When the number of segments h is equal to or more than the predetermined value, the process is ended and when the number of segments h is less than the predetermined value, the process proceeds to Step S1407.

(Step S1406) The number of collisions k is incremented by 1. Then, the process returns to Step S204.

(Step S1407) The number of segments h is incremented by 1. Then, the process returns to Step S204.

Figure 14:
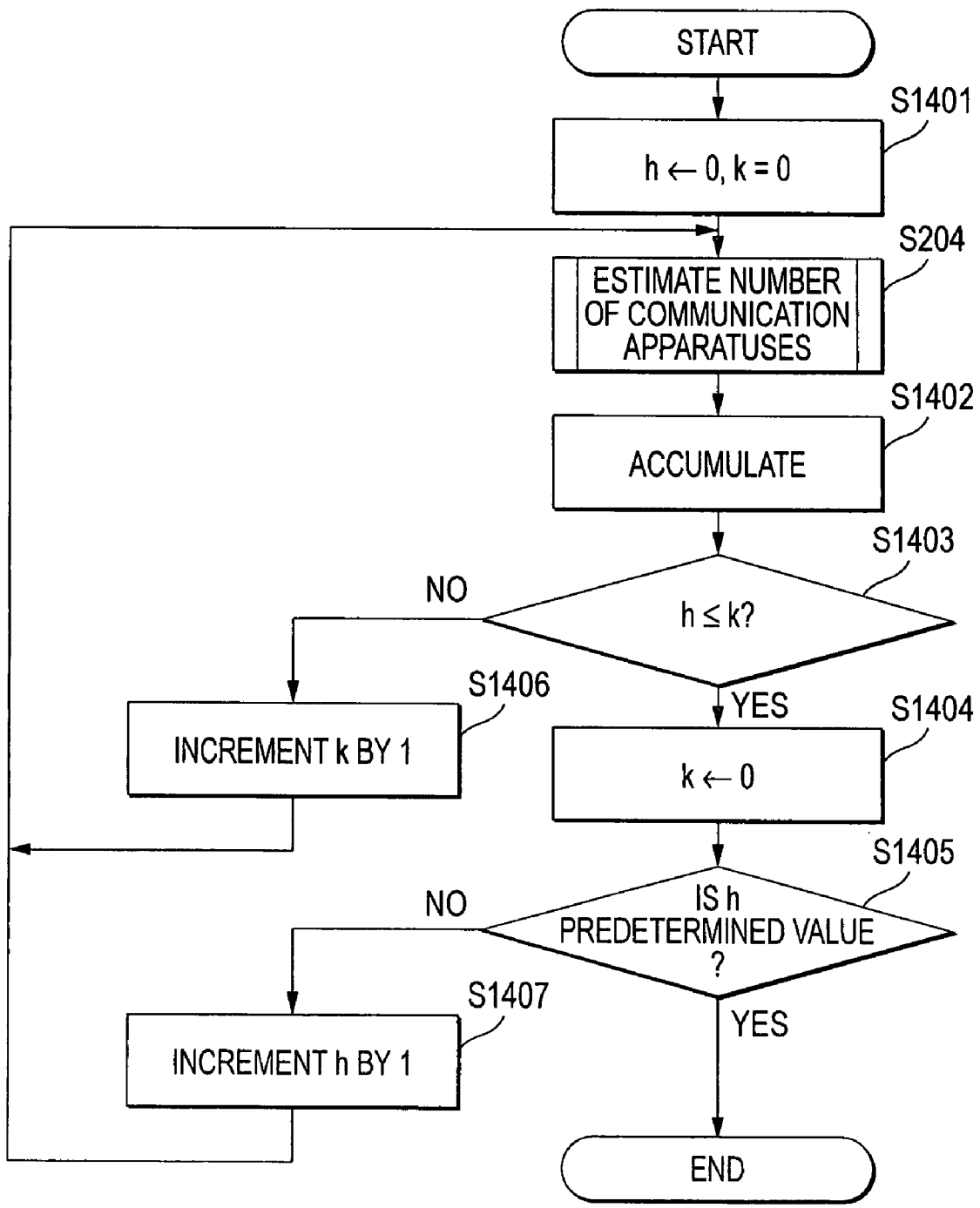
FIG. 14 is a flowchart illustrating a method of acquiring information on the number of corresponding apparatuses according to the embodiment of the invention.

In the flowchart of FIG. 14, the process is ended by the interrupt such as the power-off or the process ending.

Next, a method of acquiring the information on the number of segments by calculation will be described with reference to a flowchart of FIG. 15. Here, a case in which the calculation is performed by using the segment number acquiring unit 105 of the communication processing device 100 described in the first embodiment or a device having the same configuration as the segment number acquiring unit 105 is described. In the figure, the same reference numerals and signs as those of FIG. 2 represent steps equal to or corresponding to those of FIG. 2.

(Step S1501) 1 is substituted into the number of communication apparatuses B. The number of communication apparatuses B is just used as the number of communication apparatuses B of Step S207.

(Step S1502) The number of segments acquired in Step S209 is accumulated in the storage medium such as the memory, for example, the segment number information storing unit 309 in correspondence with the number of communication apparatuses B. Consequently, information accumulated in the storage medium serves as the information on the number of segments.

(Step S1503) It is judged whether or not the number of communication apparatuses B is equal to or more than a predetermined value. The predetermined value may be any value and is determined by a value expected to be an upper limit of the number of communication apparatuses. When the number of communication apparatuses B is equal to or more than the predetermined value, the process is ended and when the number of communication apparatuses B is less than the predetermined value, the process proceeds to Step S1505.

(Step S1505) The number of communication apparatuses B is incremented by 1.

Figure 15:
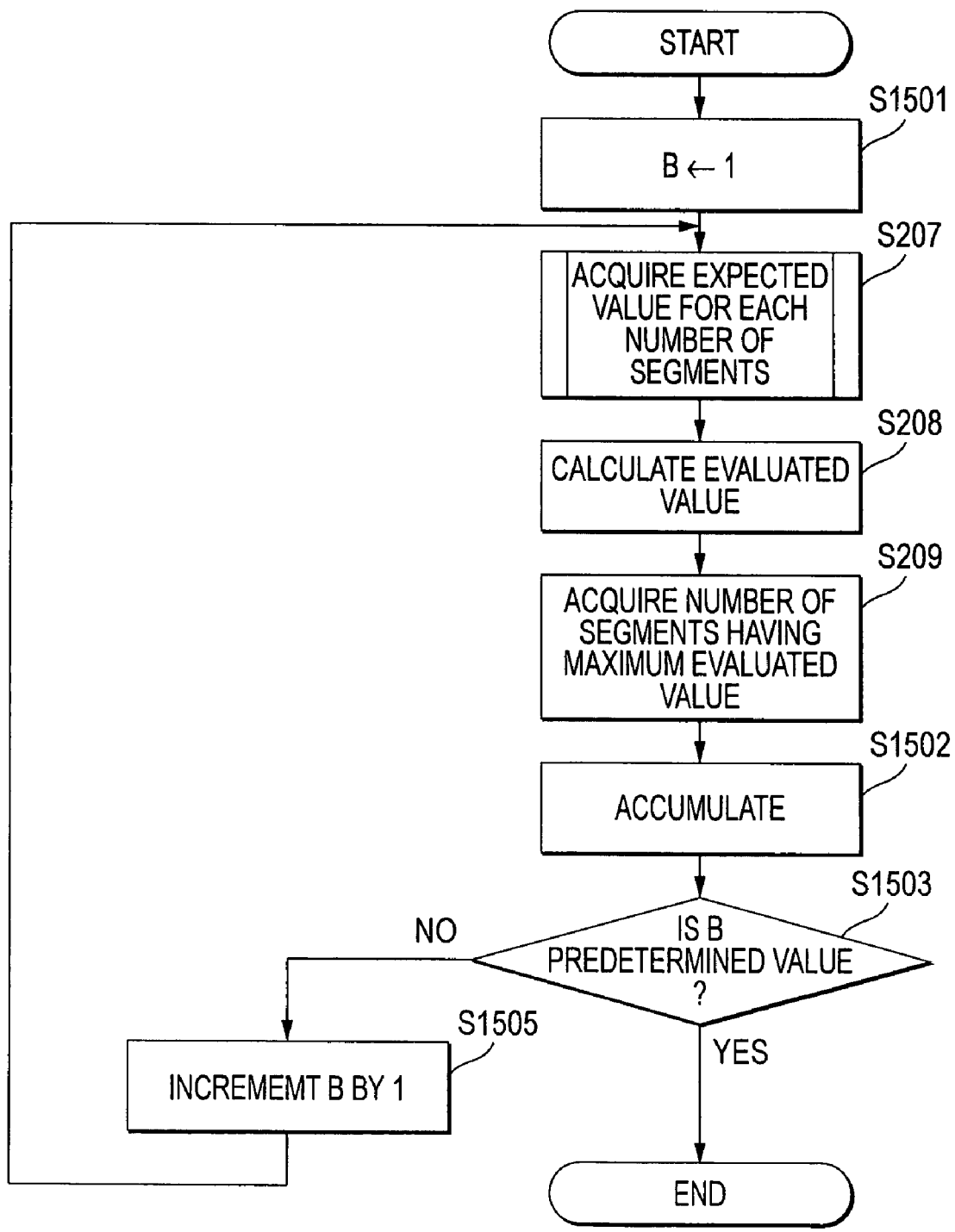
FIG. 15 is a flowchart illustrating a method of acquiring information on the number of segments according to the embodiment of the invention.

In the flowchart of FIG. 15, the process is ended by the interrupt such as the power-off or the process ending.

Hereinafter, a detailed operation of the communication system according to the embodiment of the invention will be described. A schematic diagram of the communication system is the same as that of FIG. 8 except that the communication processing device 300 is provided instead of the communication processing device 100. In a detailed example, the number of time slots is designated by using the value of Q and the value of Q is used as the number of segments.

First of all, the information on the number of corresponding apparatuses is generated in advance and is accumulated in the corresponding apparatus number information storing unit 308. Specifically, first, plurality of combinations of the value of Q regarded to be used and the number of collisions regarded to occur are first prepared, as described in the detailed example of the first embodiment, a probability in which the number of collisions becomes k for each value of Q while changing the number of communication apparatuses b is acquired for each of the combinations Consequently, the number of communication apparatuses b having the highest probability in which the number of occurring collisions is k is acquired. The number of communication apparatuses b is estimated to be the number of all the communicatable communication apparatuses. The number of communication apparatuses, the value of Q when the number of communication apparatuses is acquired, and the number of collisions which correspond to one another are accumulated in the corresponding apparatus number information storing unit 308. The corresponded information is the information on the number of corresponding apparatuses.

FIG. 16 illustrates a corresponding apparatus number information management table for managing the information on the number of corresponding apparatuses stored in the corresponding apparatus number information storing unit 308. In the corresponding apparatus number information management table, each of lines represents the number of communication apparatuses corresponding to a predetermined value of Q, each of columns represents the number of communication apparatuses corresponding to the number of collisions, and each of cells crossing each of the lines and each of the columns represents the number of communication apparatuses corresponding to the predetermined value of Q and the number of collisions. In the figure, "–" represents a part in which the calculation is not performed, "200≦" and "2≦" represent that a value is equal to or more than 200 and a value is equal to or more than 2, respectively. However, here, the calculation is ended at the time when a value is equal to or more than 201 at the time of calculating the number of communication apparatuses for convenience sake.

Next, the information on the number of segments is generated and is stored in the segment number information storing unit 309 in advance. Specifically, the plurality of numbers of communication apparatuses B regarded to be actually used are prepared and an expected value E of communication apparatuses communicatable without occurrence of the collision while changing the value of Q for each number of communication B is acquired as described in the detailed example of the first embodiment.

For example, FIG. 17 illustrates a table representing a correspondence relationship of the number of communication apparatuses, the value of Q, and the expected value E calculated by using the number of corresponding apparatuses and the value of Q. In the table, each of lines represents an expected value E corresponding to a predetermined value of Q and each of columns represents an expected value corresponding to the predetermined number of communication apparatuses, and each of cells crossing each of the lines and each of the columns represents an expected value E corresponding to the predetermined value of Q and the number of communication apparatuses. Further, in the figure, "–" represents a part in which the calculation is not performed.

Next, the calculated expected value E is divided by the number of time slots, that is, 2Q corresponding thereto to obtain an evaluated value V. Accordingly, it is possible to obtain a correspondence relationship of the number of communication apparatuses, the value of Q, and the evaluated value calculated by the number of communication apparatuses, and the value of Q.

FIG. 18 illustrates a table representing the correspondence relationship of the value of Q, the number of communication apparatuses, and the evaluated value calculated by using the value of Q and the number of communication apparatuses. In FIG. 18, each of lines represents an evaluated value V corresponding a predetermined value of Q, each of columns represents an evaluated value V corresponding to the predetermined number of communication apparatuses, and each of cells represents an evaluated value corresponding to the predetermined value of Q and the number of communication apparatuses. Further, in the figure, "–" represents a part in which the calculation is not performed.

Next, the value of Q having the highest evaluated value is acquired for each number of communication apparatuses. For example, in FIG. 18, when the number of communication apparatuses is "86", the value of Q having the highest evaluated value is "6". Accordingly, "6" is acquired as the value of Q.

The acquired value of Q and the number of communication apparatuses which correspond to each other are stored in the segment number information storing unit 309. Information in which the value of Q corresponds to the number of communication apparatuses is the information on the number of segments.

FIG. 19 illustrates a segment number information management table for managing the information on the number of segments stored in the segment number information storing unit 309. The segment number information management table has properties such as "the number of communication apparatuses" and "the optimum value of Q". "The number of communication apparatuses" represents the number of communication apparatuses and "the optimum value of Q" represents the number of segments acquired as above on the basis of the number of communication apparatuses, herein, the value of Q.

Next, one sequence of the anti-collision process is executed by the communication processing device 300 in the same manner as in the detailed example of the first embodiment. Since the process is the same manner as that in the detailed example of the first embodiment, a description thereof is omitted.

The communication apparatus number acquiring unit 304 estimates the number of communication apparatuses 200 by using the value of Q designated in the process and the number of collisions acquired in the process. Here, the communication apparatus number estimating unit 304 acquires the number of communication apparatuses specified by the value of Q and the number of collisions from the information on the number of corresponding apparatuses stored in the corresponding apparatus number information storing unit 308 as shown in FIG. 16. The number of communication apparatuses is the estimated number of communication apparatuses. For example, when the value of Q designated in a sequence just before the anti-collision process is "10" and the number of collisions is "5", the number of communication apparatuses specified from the information on the number of corresponding apparatus is "93" as shown in FIG. 16.

The segment number acquiring unit 305 subtracts the number of identifying information acquired in the preceding one sequence of the anti-collision process from the estimated number of communication apparatuses. In this case, when the acquired number of identifying information is "4", "93−4=89" is defined.

Next, the segment number acquiring unit 305 acquires the number of segments to be newly set, here, the value of Q by using a value acquired by subtracting the number of identifying information from the estimated number of communication apparatuses Specifically, the segment number acquiring unit 305 queries a record in which a value acquired by subtracting the number of identifying information from the number of communication apparatuses estimated by the communication apparatus number estimating unit 304 matches a property value of "the number of communication apparatuses" to acquire a property value of "the optimum value of Q" included in the record from the information on the number of segments stored in the segment number information storing unit 309 as shown in FIG. 19. Here, a value which the segment number acquiring unit 305 acquires by subtracting the number of identifying information from the number of communication apparatuses estimated by the communication apparatus number estimating unit 304 is "89" described above, "7" as the new value of Q is acquired.

After the segment number updating unit 106 updates the number of segments designated by the segment number designation instruction by using "7" as the value of Q acquired by the segment number acquiring unit 305, a subsequent anti-collision process sequence is performed. Since the subsequent process is the same as that in the detailed example of the first embodiment, a description thereof is omitted.

As described above, according the present embodiment, the same advantage as that of the first embodiment is obtained. At the same time, since the communication apparatus number estimating unit 304 estimates the number of communication apparatuses by using the predetermined information on the number of corresponding apparatus representing the correspondence relationship of the number of segments, the number of collisions, and the estimated number of communication apparatuses and the segment number acquiring unit 105 acquires the new number of segments from the information on the number of segments representing the correspondence relationship between the predetermined number of communication apparatuses and the number of segments by using the number of communication apparatuses corresponding to the number of communication apparatuses estimated by the communication apparatus number estimating unit 304, a calculation process for estimating the number of communication apparatuses or for acquiring the number of segments becomes unnecessary, thereby reducing a time required for the process. As a result, it is possible to reduce a time required for the anti-collision process. In addition, a high-speed processor may be unnecessary.

The segment number acquiring unit 305 has sections equal to or corresponding to the evaluated value calculating section 1052 and the corresponding segment number acquiring section 1053 previously required information on an expected value representing a relationship the number of communication apparatuses and the number of segments such as the value of Q, and the expected value E may be stored in the segment number information storing unit 309 instead of the information on the number of segments as shown in FIG. 17. In this case, the segment number acquiring unit 305 may acquire information representing a relationship between the number of segments corresponding to the number of communication apparatuses estimated by the communication apparatus number estimating unit 304 and the expected value E. Similarly to the first embodiment, the evaluated value calculating section calculates the evaluated value V by substituting the expected value and the number of segments into a desired function to acquire a correspondence relationship between the evaluated value V and the number of segments and the corresponding segment number acquiring section 1053 may acquire the number of segments corresponding to the evaluated value having the highest valuation from the correspondence relationship between the evaluated value V and the number of segments.

In each of the embodiments, each of constituent members thereof may be constituted by each of dedicated hardware or each of constituent members thereof which is can be realized by software may be realized by executing programs. For example, a program executing unit such as a CPU reads and executes software programs recorded in a recording medium such as a hard disk or a semiconductor memory, thereby realizing each of the constituent members.

Software realizing the communication processing device in each of the embodiments includes the following program. In other words, the program causes the computer to execute the steps of transmitting a segment number designation instruction serving as an instruction designating the number of segments for performing division communication with plurality of communication apparatuses having identifying information, acquiring the number of collisions serving as the number of segments in which collision occurs when the plurality of communication apparatuses allocated to the segments corresponding to the number of segments designated by the segment number designation instruction perform communication for each allocated segment, estimating the number of plurality of communication apparatuses by using the number of segments designated by the segment number designation instruction and the number of collisions, acquiring the number of segments corresponding to the estimated number of communication apparatuses by using the number of communication apparatuses estimated by the acquiring of the number of communication apparatuses, and updating the number of segments designated by the segment number designation instruction with the number of segments acquired by the acquiring of the number of segments.

In the program, the transmitting of the information or the receiving of the information does not include a process performed by hardware, for example, a process (a process performed only by hardware) performed by a modem or an interface card in the transmitting of the information. This execution method is applied to those of the other embodiments.

The program may be executed by downloading to a server and may be executed by reading a program recorded in a predetermined recording medium (for example, an optical disk such as the CD-ROM, a magnetic disk, or the semiconductor memory). This execution method is applied to that of the other embodiments.

The program may be executed by a single computer or plurality of computers. In other words, the program may be executed by an integrated process or may be executed by a distributed process. This execution method is applied to that of the other embodiments.

Third Embodiment

In the second embodiment, when the number of acquired identifying information is not subtracted from the estimated value of the number of communication apparatuses shown in Step S205, the estimated number of communication apparatuses output by the communication apparatus number estimating unit 304 matches the number of communication apparatuses used at the time when the segment number acquiring unit 105 acquires the number of segments. As the result, a property representing the number of communication apparatuses of the information on the number of corresponding apparatuses can match a property representing the number of communication apparatuses of the information on the number of segments. In the present embodiment, information representing a relationship of the number of segments designated by the segment number designation instruction, which is acquired by combination of the information on the number of corresponding apparatuses and the number of segments so as to match the number of communication apparatuses, the number of collisions, and the number of segments used for updating FIG. 20 is a block diagram of a communication system according to the embodiment of the invention. The communication system according the embodiment of the invention includes a communication processing device 400 and the plurality of communication apparatuses 200.

Since configuration and operations of the plurality of communication apparatuses 200 is the same as those of the first embodiment, a detailed description thereof is here omitted.

The communication processing device 300 includes an updated segment number acquiring unit 401 instead of the communication apparatus number estimating unit 104 and the segment number acquiring unit 105 and an updated segment number information storing unit 402 instead of the corresponding apparatus number information storing unit 308 and the segment number information storing unit 309 in the communication processing device 1 described in the second embodiment. In other words, the communication processing device 300 includes the instruction transmitting unit 101, the reception unit 102, the collision number acquiring unit 103, the segment number updating unit 106, an identifying information transmission instruction transmitting unit 107, the updated segment number acquiring unit 401, and the updated segment number information storing unit 402.

Configurations and operations of the instruction receiving unit 101, the reception unit 102, the collision number acquiring unit 103, the segment number updating unit 106, and the identifying information transmission instruction transmitting unit 107 are the same as those in the first embodiment. Accordingly, a detailed description thereof is omitted.

The updated segment number information storing unit 402 stores the update segment number information corresponding to one or more serving as the information representing the correspondence relationship of the number of segments designated by the segment number designation instruction, the number of collisions in which the collision occurs at the time of communication, and the updated number of segments serving as the number of segments for updating the number of segments designated by the segment number designation instruction, which corresponds thereto. Specifically, the information on the updated number of segments represents a correspondence relationship of the number of segments designated by the segment number designation instruction, the number of collisions serving as the number of segments in which the collision occurs at the time of communication, and the updated number of segments clearly specified thereby. Here, as a detailed example, the information on the updated number of segments is the information on the number of segments representing the information on the number of segments when the information on the number of corresponding apparatuses and the information on the number of segments described in the second embodiment are combined so that the information on the number of communication apparatuses of the information on the number of corresponding apparatuses match that of the information on the number of segments. For example, it is possible to obtain the information on the updated number of segments in correspondence with the information on the number of corresponding apparatuses by setting the number of segments corresponding to the number of communication apparatuses out of the numbers of segments instead of the number of communication apparatuses as the updated number of segments. In other words, the updated segment number information represents a correspondence relationship the number of segments designated by the segment number designation instruction, the number of collisions, and the number of segments used for updating, which is acquired by using the evaluated value in the same manner in the second embodiment from the estimated communication apparatuses by estimating the number of communication apparatuses in the same manner as in the second embodiment by using the number of segment and the number of collisions. A non-volatile recording medium is suitable for the updated segment number information storing unit 402, but the updated segment number information storing unit 402 may be realized even by a volatile recording medium.

The updated segment number acquiring unit 401 the number of segments designated by the segment number designation instruction and the number of segments to be updated, which correspond to the number of collisions acquired by the anti-collision process by using the updated segment number information stored in the updated segment number information storing unit 402. The updated segment number acquiring unit 401 acquires the number of segments designated by the segment number designation instruction and the updated number of segments specified by the number of collisions acquired by the anti-collision process. For example, when the number of segments, the number of collisions, and the updated number of segments which correspond to one another is stored in one record, the updated segment number acquiring unit 401 acquires the updated of segments included in one record in which the number of segments designated by the segment number designation instruction and the number of collisions acquired by the anti-collision process match. Here, the segment number updating unit updates the updated number of segments by using the updated number of segments. The updated segment number acquiring unit 401 can be generally realized by the MPU or the memory. A processing sequence of the updated segment number acquiring unit 401 is generally realized by software, which is recorded in the recording medium such as the ROM. However, the processing sequence of the updated segment number acquiring unit 401 may be realized by hardware (a dedicated circuit).

Next, an operation of the communication processing device 400 will be described with reference to a flowchart of FIG. 21. In FIG. 21, the same reference numerals and signs represent steps equal to or corresponding to those of FIG. 2. Accordingly, a description thereof is here omitted. A process of acquiring the information on the updated number of segments is acquired by combination of the process of acquiring the information on the number of corresponding apparatuses and the process of acquiring the information on the number of segments described in second embodiment. Accordingly, a description thereof is here described.

(Step S2101) The updated segment number acquiring unit 401 estimates the number of segments designated by the segment number designation instruction used in Step S202 and the updated number of segments corresponding to the number of collisions acquired in Step S202 by using the information on the estimated number of segments stored in the updated segment number information storing unit 402. For example, the updated segment number acquiring unit 401 queries the number of segments designated by the segment number designation instruction used in Step S202 and the number collisions acquired in Step S202 out of the number of segments and the number of collisions in the information on the updated number of segments stored in the updated segment number information storing unit 402 to acquires the updated number of segments corresponding to the matching number of segments and the matching number of collisions.

In the flowchart, the segment number updating unit 106 updates the number of segments by using the updated number of segments acquired in Step S2101.

In the flowchart of FIG. 21, the process is ended by the interrupt such as the power-off or the process ending.

Hereinafter, a detailed operation of the communication system according the embodiment of the invention will be described. A schematic diagram of the communication system is the same as that of FIG. 8 except that the communication processing device 400 is provided instead of the communication processing device 100. In a detailed example, the number of time slots is designated by using the value of Q and the value of Q is used as the number of segments.

First of all, the information on the number of corresponding apparatuses shown in FIG. 16 and the information on the number of segments shown in FIG. 19 are prepared in the same manner as in the second embodiment, a property value of "the number of segments" of a record of the information on the number of segments including a property value of "the number of communication apparatuses" matching the number of communication apparatuses is set as a property value of "the updated number of segments" instead of the number of communication apparatuses in which the information on the number of corresponding apparatuses corresponds to the number of segments and the number of collisions, the number of segments and the number of collisions of the information on the number of corresponding apparatuses correspond to each other, the information on the updated number of segments representing the correspondence relationship of the number of segments, the number of collisions, and the updated number of segments is acquired, and the information on the updated number of segments is accumulated in the updated segment number information storing unit 402.

Here, the information on the updated number of segments is configured by combining the information on the number of corresponding apparatuses and the information on the number of segments, but consequently, when the same information on the updated number of segments is acquired, an acquisition method is not considered. For example, the processes in Steps S202 and 207 shown in FIG. 2 for plurality of combinations of the value of Q and the number of collisions are sequentially executed, whereby the information on the updated number of segments may be configured.

FIG. 22 is an updated segment number information management table for updating the information on the updated number of segments accumulated in the updated segment number information storing unit 402. In the updated segment number information management table, each of lines represents the updated number of segments corresponding to a predetermined value of Q, each of columns represents the updated number of segments corresponding to the number of collisions, and each of cells crossing each of the lines and each of the columns represents the updated number of segments corresponding to the predetermined value of Q and the number of collisions. Here, for convenience of description, only a part of the updated segment number information management table is shown.

Next, one sequence of the anti-collision process is executed by the communication processing device 400 in the same manner as in the detailed example of the first embodiment. Since the process is the same as that in the detailed example of the first embodiment, a description of the process will be here omitted.

The updated segment number acquiring unit 401 acquires the updated number of segments by using the value of Q designated in the process and the number of collisions acquired in the process. Here, the updated segment number acquiring unit 401 queries and acquires the value of Q and the updated number of segments specified by the number of collisions from the information on the updated number of segments shown in FIG. 22, which stored in the updated segment number information storing unit 402. For example, when the value of Q designated a sequence judge before the anti-collision process is "6" and the number of collisions is "4", the updated number of segments serving as the updated number of segments to be newly updated becomes After the segment number updating unit 106 updates the number of segments designated by the segment number designation instruction by using "4" as the updated number of segments acquired by the updated segment number acquiring unit 401, a subsequent anti-collision process sequence is performed. Since the subsequent process is the same as that in the detailed example of the first embodiment, a description thereof is omitted.

As described above, according the present embodiment, the same advantage as that of the first embodiment is obtained. At the same time, since the updated segment number acquiring unit 401 acquires the number of segments to be updated by using the predetermined information on the updated number of segments representing the correspondence relationship of the number of segments, the number of collisions, and the number of segments to be updated, the calculation process for acquiring the number of segments becomes unnecessary, thereby reducing a time required for the process. Since the only information on the updated number of segments is prepared, it is unnecessary to prepare two information in the same manner as in the second embodiment. Accordingly, it is possible to reduce the size of the storage medium such as the memory preserving the information.

In each of the embodiments, each of constituent members thereof may be constituted by each of dedicated hardware or each of constituent members thereof which is can be realized by software may be realized by executing programs. For example, a program executing unit such as a CPU reads and executes software programs recorded in a recording medium such as a hard disk or a semiconductor memory, thereby realizing each of the constituent members.

In other words, the program causes the computer to execute the steps of transmitting a segment number designation instruction serving as an instruction designating the number of segments for performing division communication with plurality of communication apparatuses having identifying information, acquiring the number of collisions serving as the number of segments in which collision occurs when the plurality of communication apparatuses allocated to the segments corresponding to the number of segments designated by the segment number designation instruction perform communication for each allocated segment, acquiring the number of updated segments corresponding to the number of segments designated by the segment number designation instruction and the number of collisions acquired by the acquiring the number of collisions by using information on the number of updated segments serving as information representing a correspondence relationship of the number of segments, the number of collisions, and the number of updated segments serving as the number of segments for updating the number of segments designated by the segment number designation instruction, which corresponds to the number of segments and the number of collisions, and updating the number of segments designated by the segment number designation instruction with the number of updated segments acquired by the acquiring of the number of segments.

Fourth Embodiment

An information processing device according to the embodiment of the invention is an information processing device for estimating the number of communication apparatuses constituted by using the communication apparatus number estimating unit 104 described in the first embodiment.

Figure 23:
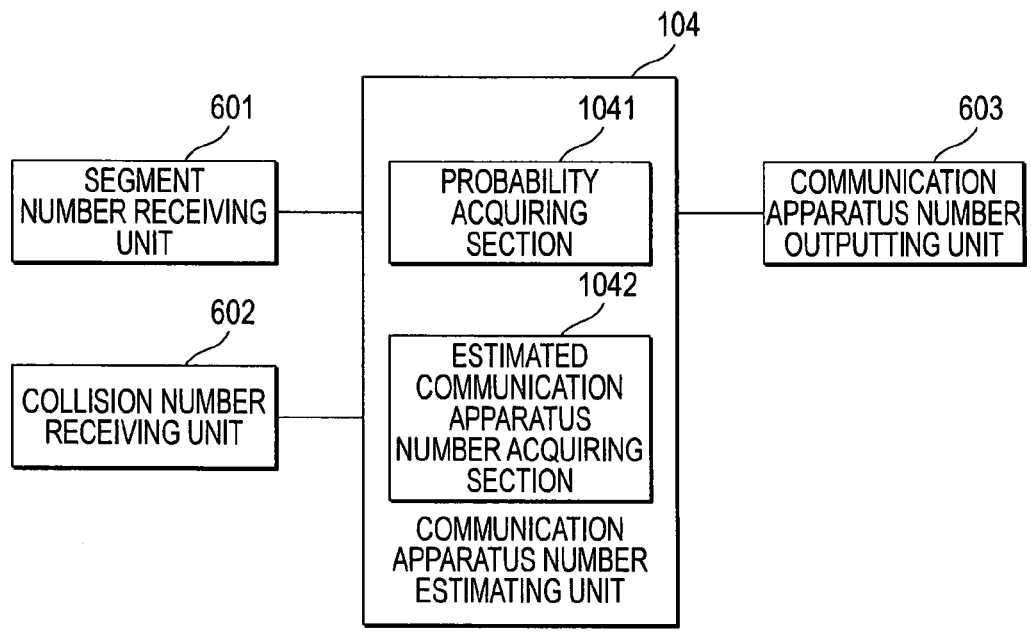
FIG. 23 is a block diagram of an information processing device according to a fourth embodiment of the invention.

FIG. 23 is a block diagram illustrating a configuration of the information processing device according to the embodiment of the invention. An information processing device 600 includes a segment number receiving unit 601, a collision number receiving unit 602, the communication apparatus number estimating unit 104, and a communication apparatus number outputting unit 603. The segment number receiving unit 601 includes the probability acquiring section 1041 and the estimated communication apparatus number acquiring section 1042.

The segment number receiving unit 601 receives the number of segments for performing division communication with the plurality of communication apparatuses having the identifying information. Since the number of segments is the same as the number of segments described in each of the embodiments, a description thereof is omitted. The segment number receiving unit 601 may receive the number of segments transmitted from other apparatuses via a communication line and may read the number of segments recorded in the recording medium. The segment number receiving unit 601 may receive the number of segments input by an input section such as a numeric key pad, a keyboard, a mouse, or a menu screen. The segment number receiving unit 601 can be realized by a device driver of the input section such as the numeric key pad or the keyboard, control software of the menu screen, a driver of a communication device, a device driver reading information from the recording medium such as a memory card reader or a CD-ROM drive.

The collision number receiving unit 602 receives the number of collisions serving as the number of segments in which the collision occurs at the time of performing communication with the plurality of communication apparatuses allocated to the segments corresponding to the number of segments for each allocated segment. Since the number of collisions is the same as the number of collisions described in each of the embodiments, a description thereof is omitted. The collision number receiving unit 602 may receive the number of collisions transmitted from other apparatuses via the communication line and may read the number of collisions recorded in the recording medium. The collision number receiving unit 602 may receive the number of collisions input by the input section such as the numeric key pad, the keyboard, the mouse, or the menu screen. The collision number receiving unit 602 can be realized by the device driver of the input section such as the numeric key pad or the keyboard, the control software of the menu screen, the driver of the communication device, the device driver reading the information from the recording medium such as the memory card reader or the CD-ROM drive.

Since a configuration of the communication apparatus number estimating unit 104 is the same as that of the first embodiment, a description thereof is omitted. However, here, the number of segments received by the segment number receiving unit 601 is input and the number of collisions received by the collision number receiving unit 602 is input into the communication apparatus number estimating unit 104.

The communication apparatus number outputting unit 603 outputs the number of communication apparatuses estimated to be the number of segments and the number of collisions output by the communication apparatus number estimating unit 104. The output includes display on a display, printing on a printer, output of a sound, and transmission to an external device. Although the communication apparatus number outputting unit 603 includes an output device such as the display or a speaker, the communication apparatus number outputting unit 603 may not include the output device. The communication apparatus number outputting unit 603 can be realized by driver software of the output device or driver software of the output device and the output device.

An operation of the information processing device 600 according to the embodiment of the invention is the same as a process of estimating the number of communication apparatuses described with reference to FIG. 4 in the first embodiment except that the communication apparatus number estimating unit 104 estimates the number of communication apparatuses and the communication apparatus number outputting unit 603 outputs the number of communication apparatuses estimated by the communication apparatus number estimating unit 104 on the basis of the number of segments and the number of collisions by the segment number receiving unit 601 and the collision number receiving unit 602. Accordingly, a description thereof is omitted.

As described above, according to the embodiment of the invention, it becomes possible to estimate the number of communicatable communication apparatuses in accordance with the number of collisions detected in one sequence of the anti-collision process and the number of segments designated in the sequence. Accordingly, it becomes possible to properly set the number of segments in accordance with the estimated number of communication apparatuses.

In the present embodiment, a case in which the communication apparatus number estimating unit 104 according to the first embodiment is used is described, but in the present invention, the communication apparatus number estimating unit 304 according to the second embodiment may be used with the corresponding apparatus number information storing unit 308.

In the present embodiment, the updated segment number acquiring unit 401 described in the third embodiment is used with the updated segment number information storing unit 402 instead of the communication apparatus number estimating unit 104 and the communication apparatus number outputting unit 603 may output the updated number of segments acquired by the updated segment number acquiring unit 401 instead of the number of communication apparatuses.

Software realizing the information processing device according to the embodiment includes the following program. In other words, the program causes the computer to execute the steps of receiving the number of segments for performing division communication with the plurality of communication apparatuses having identifying information, receiving the number of collisions serving as the number of segments in which collision occurs at the time of performing communication with the plurality of communication apparatuses allocated to the segments corresponding to the number of segments for each allocated segment, estimating the number of plurality of communication apparatuses based on the number of segments received by the receiving of the number of segments and the number of collisions received by the receiving of the number of collisions, and outputting the number of communication apparatuses estimated by the estimating of the number of communication apparatuses.

Fifth Embodiment

An information processing device according to the embodiment of the invention is an information processing device for estimating the number of segments constituted by using the segment number acquiring unit 105 described in the first embodiment.

Figure 24:
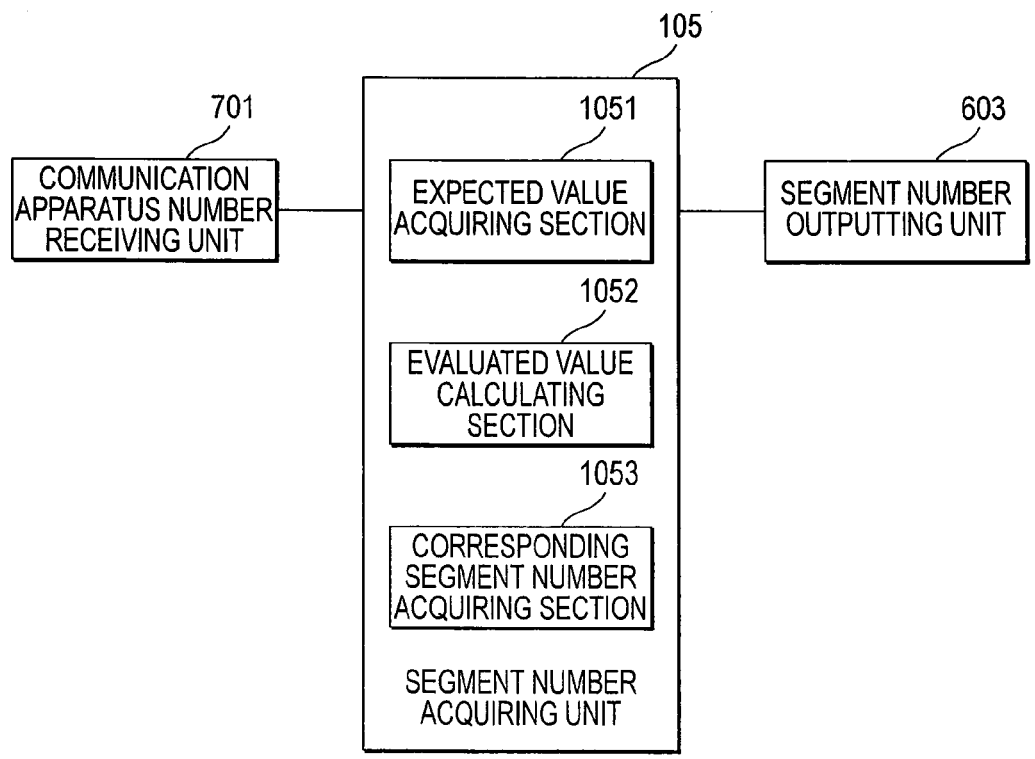
FIG. 24 is a block diagram of an information processing device according to a fifth embodiment of the invention.

FIG. 24 is a block diagram illustrating a configuration of the information processing device according to the embodiment of the invention. An information processing device 700 includes a communication apparatus number receiving unit 701, the segment number acquiring unit 105, and a segment number outputting unit 702. The segment number acquiring unit 105 includes the expected value acquiring section 1051, the evaluated value calculating section 1052, and the corresponding segment number acquiring section 1053.

The communication apparatus number receiving unit 701 receives the number of plurality of communication apparatuses having the identifying information. Since the identifying information is the same as the identifying information described in each of the embodiments, a description thereof is omitted. The communication apparatus number receiving unit 701 may receive the number of segments transmitted from other apparatuses via the communication line and may read the number of segments recorded in the recording medium. The communication apparatus number receiving unit 701 may receive the number of communication apparatuses input by the input section such as the numeric key pad, the keyboard, the mouse, or the menu screen. The communication apparatus number receiving unit 701 can be realized by the device driver of the input section such as the numeric key pad or the keyboard, the control software of the menu screen, the driver of the communication device, the device driver reading the information from the recording medium such as the memory card reader or the CD-ROM drive.

An operation of the segment number acquiring unit 105 is the same as that in the first embodiment except that the number of segments is acquired by using the number of communication apparatuses input from the communication apparatus number receiving unit 701. Accordingly, a description thereof is omitted.

The segment number outputting unit 702 outputs the number of segments output by the segment number acquiring unit 105. The output includes display on the display, printing on the printer, output of the sound, and transmission to the external device. Although the segment number outputting unit 702 includes the output device such as the display or the speaker, the segment number outputting unit 702 may not include the output device. The segment number outputting unit 702 can be realized by the output device, the driver software thereof or the driver software thereof.

An operation of the information processing device 700 according to the embodiment of the invention is the same as those of the processes of Steps S207 to S209 of FIG. 2 described in the first embodiment except that the segment number estimating unit 105 estimates the number of segments and the segment number outputting unit 702 outputs the number of segments estimated by the segment number estimating unit 105 on the basis of the number of communication apparatuses received by the communication apparatus number receiving unit 701. Accordingly, a description thereof is omitted.

As described above, according to the embodiment of the invention, it becomes possible to set the number of segments a communication process in accordance with the number of communicatable communication apparatuses, for example, the number of segments setting the number of divided times, for example, the number of time slots. Accordingly, it becomes possible to properly set the number of segments in accordance with the number of communication apparatuses, thereby obtaining an increase in efficiency of the communication process.

In the present embodiment, a case in which the segment number acquiring unit 105 according to the first embodiment is used is described, but in the present invention, the segment number acquiring unit 305 according to the second embodiment may be used with the segment number information storing unit 309.

In each of the embodiments, particularly in a detailed example, a case in which the number of segments is the number of time slots is exemplified. As described above, in the present invention, the number of segments is not limited to the number of time slots. For example, the number of segments may be the number of channels at the time of performing frequency division communication.

The communication apparatus is not limited to the RFID tag and may be the communication apparatus a computer connectable to a network such as a general LAN or a network apparatus such as a router.

In each of the embodiments, each process (each function) may be realized by an integrated process performed by a single device (system) or may be realized by a distributed process performed by a plurality of devices.

Software realizing the information processing device according to the embodiment includes the following program. The program causes the computer to execute the steps of receiving the number of the plurality of communication apparatuses having the identifying information, acquiring the number of segments for performing communication with the plurality of communication apparatuses corresponding to the number of communication apparatuses based on the number of communication apparatuses received in the step of receiving the number of communication apparatuses, and outputting the number of segments acquired in the step of acquiring of the number of segments.

In each of the embodiments, at least two communication sections (an information transmitting unit and the like) may be realized by one physical medium.

The present invention is not limited to the above-mentioned embodiments, but various modifications may occur and may be included in the scope of the present invention.

As described above, a communication processing device according to the present invention is suitable for a communication processing device performing division communication with plurality of communication apparatuses having identifying information and particularly, it is useful as a communication processing device performing division communication with a communication apparatus such as an RFID tag by segments such as slots.

While the invention has been described in connection with the exemplary embodiments, it will be obvious to those skilled in the art that various changes and modification may be made therein without departing from the present invention, and it is aimed, therefore, to cover in the appended claims all such changes and modifications as fall within the spirit and scope of the present invention.

What is claimed is:

1. A communication processor, adapted to perform communications with a plurality of communication devices each of which is provided with identifying information, the communication processor comprising:

an instruction transmitter configured to transmit an instruction designating a first segment number indicative of a total number of communication segments to be used to perform communications with the communication devices;

a collision number identifier configured to identify a collision number indicative of how many of the communication segments detect a collision between the communication devices when the communications are performed with the communication devices under a condition that each of the communication devices is allocated to one of the communication segments;

a segment number identifier configured to identify a second segment number indicative of how many communication segments are required to perform communications with the communication devices without collision, based on the first segment number and the collision number, and to identify a communication failure number indicative of how many of the communication devices failed to perform the communications with reference to the first segment number and the collision number, so that the second segment number is identified with reference to the communication failure number; and a segment number updater configured to update the first segment number with the second segment number, wherein the segment number identifier includes:

an estimator configured to prepare different segment numbers, and to obtain estimation values each of which is indicative of how many of the communication devices are capable of performing the communications without collision under a condition that the communication devices indicated by the communication failure number are allocated to the communication segments indicated by an associated one of the different segment numbers; and an evaluator configured to obtain evaluation values by respectively substituting the estimation values and the different segment numbers into an evaluating function which is an increasing function for the evaluation values and a decreasing function for the different segment numbers, the segment number identifier is configured to identify, as the second segment number, one of the different segment numbers with which the highest one of the evaluation values is obtained.

2. The communication processor as set forth in claim 1, further comprising:

a storage medium, configured to store correspondence information indicative of correspondence among the first segment number, the collision number and the second segment number, wherein:

the segment number identifier is configured to identify the second segment number with reference to the correspondence information.

3. The communication processor as set forth in claim 1, further comprising:

an estimator, configured to estimate a total number of the communication devices with reference to the first segment number and the collision number, wherein:

the segment number identifier is configured to identify the second segment number with reference to the estimated total number.

4. The communication processor as set forth in claim 3, further comprising:

a receiver, configured to receive the identifying information transmitted from each of the communication devices, wherein:

the segment number identifier is configured to identify the second segment number as a number corresponding to a number of the communication devices obtained by subtracting a number of the communication devices from which the identifying information is received from the estimated total number.

5. The communication processor as set forth in claim 3, wherein:

the estimator configured to estimate the total number of the communication devices includes a probability identifier, configured to prepare different total numbers, and to obtain probabilities each of which indicates the communication devices of an associated one of the different total numbers of the communication devices are allocated to the communication segments indicated by the first segment number with the collision number; and the estimator configured to estimate the total number of the communication devices is configured to identify, as the estimated total number, one of the different total numbers with which the highest one of the probabilities is obtained.

6. The communication processor as set forth in claim 3, further comprising:

a storage medium, configured to store correspondence information indicative of correspondence among the first segment number, the collision number and the second segment number, wherein:

the segment number identifier is configured to identify the second segment number with reference to the correspondence information.

7. The communication processor as set forth in claim 3, further comprising:

a storage medium, configured to store correspondence information indicative of correspondence between the first segment number and the total number of the communication devices, wherein:

the segment number identifier is configured to identify the second segment number with reference to the correspondence information.

8. A communication processing device, adapted to perform communications with a plurality of communication apparatuses each of which is provided with identifying information, the communication processing device comprising:

an instruction transmitter, configured to transmit an instruction designating a first segment number indicative of a total number of communication segments to be used to perform communications with the communication apparatuses;

a collision number identifier, configured to identify a collision number indicative of how many of the communication segments detect a collision between the communication apparatuses when the communications are performed with the communication apparatuses under a condition that each of the communication apparatuses devices is allocated to one of the communication segments;

an apparatus a number estimator, configured to estimate a total number of the communication apparatuses with reference to the first segment number and the collision number;

a segment number identifier configured to identify a second segment number corresponding to the estimated total number of the communication apparatuses; and a segment number updater configured to update the first segment number with the second segment number, wherein the segment number identifier includes:

an estimator configured to prepare different segment numbers, and to obtain estimation values each of which is indicative of how many of the communication apparatuses are capable of performing the communications without collision under a condition that the communication apparatuses indicated by a communication failure number are allocated to the communication segments indicated by an associated one of the different segment numbers; and an evaluator configured to obtain evaluation values by respectively substituting the estimation values and the different segment numbers into an evaluating function which is an increasing function for the evaluation values and a decreasing function for the different segment numbers, the segment number identifier is configured to identify, as the second segment number, one of the different segment numbers with which the highest one of the evaluation values is obtained.

9. A method of performing communications with a plurality of communication devices each of which is provided with identifying information, the method comprising:

transmitting an instruction designating a first segment number indicative of a total number of communication segments to be used to perform communications with the communication devices;

identifying a collision number indicative of how many of the communication segments detect a collision between the communication devices when the communications are performed with the communication devices under a condition that each of the communication devices is allocated to one of the communication segments;

identifying a communication failure number indicative of how many of the communication devices failed to perform the communications with reference to the first segment number and the collision number;

preparing different segment numbers, and obtaining estimation values each of which is indicative of how many of the communication devices is capable of performing the communications without collision under a condition that the communication devices indicated by the communication failure number are allocated to the communication segments indicated by an associated one of the different segment numbers;

obtaining evaluation values by respectively substituting the estimation values and the different segment numbers into an evaluating function which is an increasing function for the evaluation values and a decreasing function for the different segment numbers;

identifying a second segment number indicative of how many communication segments are required to perform communications with the communication devices without collision, the second segment number being identified as one of the different segment numbers with which the highest one of the evaluation values is obtained and based on the first segment number, the communication failure number, and the collision number; and updating the first segment number with the second segment number.

10. A non-transitory recording medium having recorded thereon a program configured to cause a computer to execute the method as set forth in claim 9.

* * * * *